(12) United States Patent
Shigeta et al.

(10) Patent No.: US 11,144,187 B2
(45) Date of Patent: Oct. 12, 2021

(54) STORAGE MEDIUM HAVING STORED THEREIN GAME PROGRAM, INFORMATION PROCESSING SYSTEM, INFORMATION PROCESSING APPARATUS, AND GAME PROCESSING METHOD

(71) Applicant: NINTENDO CO., LTD., Kyoto (JP)

(72) Inventors: Waki Shigeta, Kyoto (JP); Atsuki Yoshinaga, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 16/674,385

(22) Filed: Nov. 5, 2019

(65) Prior Publication Data

US 2020/0142579 A1    May 7, 2020

(30) Foreign Application Priority Data

Nov. 6, 2018  (JP) .......................... JP20018-209219

(51) Int. Cl.
*G06F 3/0485* (2013.01)
*A63F 13/537* (2014.01)
*G06F 3/0484* (2013.01)
*G06F 3/0482* (2013.01)

(52) U.S. Cl.
CPC ........ *G06F 3/04855* (2013.01); *A63F 13/537* (2014.09); *G06F 3/0482* (2013.01); *G06F 3/04847* (2013.01)

(58) Field of Classification Search
CPC ............... G06F 3/04855; G06F 3/0482; G06F 3/04847; G06F 3/0485; G06F 3/0484; G06F 3/0481; A63F 13/537; A63F 13/53
See application file for complete search history.

(56) References Cited

U.S. PATENT DOCUMENTS

| | | | | |
|---|---|---|---|---|
| 5,371,846 A * | 12/1994 | Bates | .................. | G06F 3/04855 345/684 |
| 5,506,951 A * | 4/1996 | Ishikawa | ............. | G06F 3/04855 715/777 |
| 5,526,480 A * | 6/1996 | Gibson | ............... | G06F 3/04855 715/210 |
| 5,680,533 A * | 10/1997 | Yamato | .................. | A63F 13/10 345/473 |
| 5,903,267 A * | 5/1999 | Fisher | ................. | G06F 3/04855 345/157 |

(Continued)

FOREIGN PATENT DOCUMENTS

JP    2012-068991    4/2012

OTHER PUBLICATIONS

GodsWar Online Game (http://web.archive.org/web/20180531032304/ http://gw.igg.com/guide/guide.php?acid=75; pub date: May 31, 2018; downloaded on May 4, 2020).*

*Primary Examiner* — Jung-Mu T Chuang
(74) *Attorney, Agent, or Firm* — Nixon & Vanderhye P.C.

(57) ABSTRACT

An example of a computer of an information processing apparatus causes a display device to display, in a scrollable manner, a part of an item group image which includes a plurality of items arranged in an order. The computer causes the display device to display a scrollbar including a knob that indicates the part, of the item group image, which is displayed on the display device, and a track area in which the knob is movable. The computer causes a marker to be displayed in association with the scrollbar.

16 Claims, 12 Drawing Sheets

(56) References Cited

U.S. PATENT DOCUMENTS

| | | | | |
|---|---|---|---|---|
| 6,034,688 A * | 3/2000 | Greenwood | G06F 3/0485 | 715/784 |
| 6,215,490 B1 * | 4/2001 | Kaply | G06F 3/0481 | 715/788 |
| 6,240,397 B1 * | 5/2001 | Sachs | G06Q 30/02 | 705/14.14 |
| 6,571,216 B1 * | 5/2003 | Garg | G06Q 30/02 | 705/14.25 |
| 6,590,594 B2 * | 7/2003 | Bates | G06F 3/04855 | 715/764 |
| 7,025,674 B2 * | 4/2006 | Adams | G06Q 30/02 | 463/1 |
| 7,174,510 B2 * | 2/2007 | Salter | G09B 5/06 | 715/709 |
| 7,328,411 B2 * | 2/2008 | Satanek | G06F 3/04855 | 715/786 |
| 7,698,652 B2 * | 4/2010 | Sagar | H04M 1/2747 | 715/787 |
| 7,765,491 B1 * | 7/2010 | Cotterill | G06F 3/0485 | 715/833 |
| 7,848,964 B2 * | 12/2010 | Bonner | H04L 67/12 | 370/493 |
| 8,021,232 B2 * | 9/2011 | Yamamura | A63F 13/10 | 463/30 |
| 8,052,520 B2 * | 11/2011 | Park | G06Q 10/087 | 463/25 |
| 8,108,792 B2 * | 1/2012 | Lin-Hendel | G06F 3/0485 | 715/785 |
| 8,182,345 B2 * | 5/2012 | Saito | A63F 13/12 | 463/42 |
| 8,261,231 B1 * | 9/2012 | Hirsch | G06F 8/20 | 709/201 |
| 8,271,344 B1 * | 9/2012 | Channakeshava | G06Q 30/00 | 705/1.1 |
| 8,414,386 B2 * | 4/2013 | Slomiany | G07F 17/32 | 463/16 |
| 8,433,610 B2 * | 4/2013 | Postrel | G06Q 30/02 | 705/14.29 |
| 8,510,137 B2 * | 8/2013 | Bonev | G06F 16/489 | 705/5 |
| 8,568,237 B2 * | 10/2013 | Kelly | G07F 17/3225 | 463/42 |
| 8,675,019 B1 * | 3/2014 | Feinstein | G09G 5/026 | 345/634 |
| 8,769,403 B2 * | 7/2014 | Tsuda | G06F 3/0485 | 715/252 |
| 8,790,171 B2 * | 7/2014 | Yoshie | A63F 13/12 | 463/8 |
| 8,814,688 B2 * | 8/2014 | Barney | A63F 13/10 | 463/39 |
| 8,850,478 B2 * | 9/2014 | Moshiri | H04N 5/44513 | 725/40 |
| 8,935,630 B2 * | 1/2015 | Wroblewski | G06F 3/0346 | 715/764 |
| 8,984,436 B1 * | 3/2015 | Tseng | G06F 1/1624 | 715/786 |
| 9,079,097 B2 * | 7/2015 | Hansson | A63F 13/2145 | |
| 9,134,891 B1 * | 9/2015 | Schultz | G06F 3/0486 | |
| 9,186,582 B2 * | 11/2015 | Janis | A63F 13/00 | |
| 9,233,306 B2 * | 1/2016 | Kim | G06Q 50/01 | |
| 9,256,355 B1 * | 2/2016 | Tseng | G06F 1/1624 | |
| 9,595,077 B1 * | 3/2017 | Le | G06F 3/04855 | |
| 9,612,735 B2 * | 4/2017 | Schulz | G06F 3/04855 | |
| 9,652,117 B2 * | 5/2017 | Brown | G06F 3/0482 | |
| 9,652,140 B2 * | 5/2017 | Song | G06F 3/04855 | |
| 9,696,898 B2 * | 7/2017 | Matas | G06F 3/0481 | |
| 9,778,830 B1 * | 10/2017 | Dubin | A63F 13/65 | |
| 9,864,501 B2 * | 1/2018 | Tuli | G06F 3/04855 | |
| 9,922,337 B2 * | 3/2018 | Circe | G06Q 30/02 | |
| 10,031,658 B2 * | 7/2018 | Ryu | G06F 3/04855 | |
| 10,155,169 B2 * | 12/2018 | Botta | A63F 13/69 | |
| 10,272,328 B2 * | 4/2019 | Knutsson | G07F 17/32 | |
| 10,282,068 B2 * | 5/2019 | Dubin | A63F 13/65 | |
| 10,339,555 B2 * | 7/2019 | Kumar Goel | G06Q 30/0233 | |
| 10,692,097 B2 * | 6/2020 | Sigelagelani | G06Q 30/0201 | |
| 2002/0122066 A1 * | 9/2002 | Bates | G09G 5/14 | 715/786 |
| 2002/0145631 A1 * | 10/2002 | Arbab | G06F 3/04855 | 715/786 |
| 2003/0151628 A1 * | 8/2003 | Salter | G09B 5/06 | 715/773 |
| 2004/0224757 A1 * | 11/2004 | Yamamura | A63F 13/10 | 463/30 |
| 2005/0060230 A1 * | 3/2005 | Kaye | G06Q 30/02 | 705/14.19 |
| 2005/0192071 A1 * | 9/2005 | Matsuno | A63F 13/822 | 463/1 |
| 2005/0210403 A1 * | 9/2005 | Satanek | G06F 3/04855 | 715/786 |
| 2006/0090141 A1 * | 4/2006 | Loui | G06F 16/447 | 715/764 |
| 2007/0026937 A1 * | 2/2007 | Yokoyama | G07F 17/34 | 463/25 |
| 2007/0060315 A1 * | 3/2007 | Park | G06Q 10/087 | 463/25 |
| 2008/0022215 A1 * | 1/2008 | Lee | G06F 3/04855 | 715/762 |
| 2008/0086755 A1 * | 4/2008 | Darnell | H04N 21/2668 | 725/105 |
| 2008/0134033 A1 * | 6/2008 | Burns | G06F 16/951 | 715/705 |
| 2008/0214311 A1 * | 9/2008 | Saito | A63F 13/792 | 463/42 |
| 2009/0197670 A1 * | 8/2009 | Kelly | G07F 17/3267 | 463/25 |
| 2009/0216569 A1 * | 8/2009 | Bonev | G06Q 10/109 | 705/5 |
| 2010/0131886 A1 * | 5/2010 | Gannon | G06F 3/04855 | 715/786 |
| 2010/0169790 A1 * | 7/2010 | Vaughan | H04M 1/72415 | 715/740 |
| 2010/0280896 A1 * | 11/2010 | Postrel | G06Q 30/0226 | 705/14.29 |
| 2011/0087997 A1 * | 4/2011 | Lee | G06F 3/04855 | 715/830 |
| 2011/0265039 A1 * | 10/2011 | Lyon | G06F 3/04883 | 715/830 |
| 2012/0036428 A1 * | 2/2012 | Tsuda | G06F 3/048 | 715/252 |
| 2012/0075352 A1 | 3/2012 | Mizutani et al. | | |
| 2012/0110483 A1 * | 5/2012 | Arcese | G06F 3/04855 | 715/768 |
| 2012/0203617 A1 * | 8/2012 | Postrel | G06Q 30/0226 | 705/14.29 |
| 2012/0231877 A1 * | 9/2012 | Slomiany | G07F 17/3267 | 463/25 |
| 2012/0238361 A1 * | 9/2012 | Janis | A63F 13/12 | 463/31 |
| 2012/0238367 A1 * | 9/2012 | Ki Do | A63F 13/79 | 463/43 |
| 2012/0271737 A1 * | 10/2012 | Sato | G09B 29/007 | 705/26.62 |
| 2013/0055409 A1 * | 2/2013 | Chen | G06Q 30/0207 | 726/28 |
| 2013/0103484 A1 * | 4/2013 | McLaughlin | G06Q 30/0226 | 705/14.33 |
| 2013/0117708 A1 * | 5/2013 | Lee | G06F 3/0485 | 715/786 |
| 2013/0191202 A1 * | 7/2013 | Postrel | G06Q 30/0233 | 705/14.29 |
| 2013/0316810 A1 * | 11/2013 | Minami | A63F 13/95 | 463/29 |
| 2014/0047331 A1 * | 2/2014 | Feldman | G06F 40/205 | 715/273 |
| 2014/0080600 A1 * | 3/2014 | Knutsson | G07F 17/32 | 463/31 |

(56) References Cited

U.S. PATENT DOCUMENTS

| | | | | |
|---|---|---|---|---|
| 2014/0100939 A1* | 4/2014 | Postrel | G06Q 30/0239 | 705/14.33 |
| 2014/0137013 A1* | 5/2014 | Matas | G06F 3/0481 | 715/764 |
| 2014/0156392 A1* | 6/2014 | Ouimet | G06Q 30/0633 | 705/14.49 |
| 2014/0309025 A1* | 10/2014 | Kim | G06F 3/0481 | 463/31 |
| 2014/0351078 A1* | 11/2014 | Kaplan | G06Q 30/0631 | 705/26.7 |
| 2014/0365886 A1* | 12/2014 | Koenig | G06F 3/04855 | 715/711 |
| 2014/0370950 A1* | 12/2014 | Hansson | A63F 13/23 | 463/9 |
| 2014/0372192 A1* | 12/2014 | Circe | G06Q 50/01 | 705/14.19 |
| 2015/0009230 A1* | 1/2015 | Matsuhashi | G06F 3/14 | 345/619 |
| 2015/0046241 A1* | 2/2015 | Salmon | G06Q 30/0216 | 705/14.18 |
| 2015/0058730 A1* | 2/2015 | Dubin | A63F 13/327 | 715/719 |
| 2015/0058780 A1* | 2/2015 | Malik | H04N 21/2223 | 715/772 |
| 2015/0348083 A1* | 12/2015 | Brill | G06Q 20/386 | 705/14.23 |
| 2016/0041736 A1* | 2/2016 | Schulz | G06F 3/0482 | 715/772 |
| 2016/0148307 A1* | 5/2016 | Ram | G06F 3/04817 | 705/27.1 |
| 2016/0171525 A1* | 6/2016 | Ezra | G06Q 30/0209 | 705/14.12 |
| 2016/0279521 A1* | 9/2016 | Knutsson | A63F 13/75 | |
| 2017/0085854 A1* | 3/2017 | Furesjo | H04N 7/152 | |
| 2017/0348597 A1* | 12/2017 | Nishimura | A63F 13/35 | |
| 2018/0032215 A1* | 2/2018 | Rao | G06F 3/0482 | |
| 2018/0117476 A1* | 5/2018 | Botta | A63F 13/5375 | |
| 2018/0121944 A1* | 5/2018 | Schwartz | G06Q 30/0208 | |
| 2020/0070056 A1* | 3/2020 | Laker | A63F 13/35 | |
| 2020/0125244 A1* | 4/2020 | Feinstein | G06F 3/04883 | |
| 2020/0142579 A1* | 5/2020 | Shigeta | A63F 13/533 | |
| 2020/0327821 A1* | 10/2020 | Holzheimer | G09B 5/04 | |

* cited by examiner

STORAGE MEDIUM HAVING STORED THEREIN GAME PROGRAM, INFORMATION PROCESSING SYSTEM, INFORMATION PROCESSING APPARATUS, AND GAME PROCESSING METHOD

CROSS REFERENCE TO RELATED APPLICATION

The disclosures of Japanese Patent Application No. 2018-209219, filed on Nov. 6, 2018, are incorporated herein by reference.

FIELD

The technique shown here relates to a storage medium having stored therein a game program, an information processing system, an information processing apparatus, and a game processing method which are configured to present a plurality of items to a user.

BACKGROUND AND SUMMARY

When displaying a part of a content in a scrollable manner, an information processing apparatus displays a scrollbar that indicates the position of the displayed part with respect to the entire content.

With such a scrollbar, a user cannot easily grasp where a part, of the entire content, that the user desires to browse is located, which makes it difficult to easily display the part that the user desires to browse.

Therefore, the present application discloses a storage medium having stored therein a game program, an information processing system, an information processing apparatus, and a game processing method which allow a user to easily display a part of a content that the user desires to browse.

(1) An example of a storage medium described in the present specification is a non-transitory computer-readable storage medium having, stored therein, a game program that causes the computer to function as item display means, scrollbar display means, and marker display means. The item display means causes a display device to display, in a scrollable manner, a part of an item group image that includes a plurality of items arranged in an order. The scrollbar display means causes the display device to display a scrollbar including: a knob corresponding to a displayed part of the item group image; and a track area in which the knob is movable. The displayed part indicated by a position of the knob is displayed on the display device. The marker display means causes a marker to be displayed in association with the scrollbar. A position of the marker indicates a part of the item group image. The marker may be displayed at a position according to an item that satisfies a condition regarding a parameter related to a game.

According to the configuration of the above (1), the user can easily cause a desired part of the content (i.e., the item group image) to be displayed by moving the knob with the marker as a guide.

(2) Each of the plurality of items may be assigned to one category among a plurality of categories. In the item group image, items assigned to the same category may be collectively arranged. The computer may display the marker at a position corresponding to each of the plurality of categories.

According to the configuration of the above (2), the marker allows the user to recognize the position of the category. Thus, the user can easily cause a part, of the content, corresponding to items classified into a desired category to be displayed.

(3) The computer may display the marker at a position corresponding to a head of each of the plurality of categories, or a position corresponding to a head item in the order among one or more items assigned to the category.

According to the configuration of the above (3), the marker allows the user to recognize the position, in the item group image, near the head of the category. This enables the user to easily confirm the items in order from the head of the category, thereby improving convenience in operation to the content.

(4) The computer may further display a marker at a position corresponding to a category different from a category in which an item that satisfies a condition is present, in a display form different from that for a marker displayed at a position corresponding to the category in which the item that satisfies the condition is present.

According to the configuration of the above (4), the user is also allowed to recognize the position of the category different from the category in which the item that satisfied the condition is present.

(5) The game program may further cause the computer to execute: performing a game process based on an operation performed by a user; and changing the parameter based on a result of the game process. The computer may display a marker at a position according to an item that satisfies the condition with respect to the parameter having been changed.

According to the configuration of the above (5), since the position of the marker can be dynamically changed according to the result of the game process, the marker can be displayed at a position according to the state or situation of the game.

(6) The item may indicate a game object to be used in the game process.

(7) The item may indicate a game object that gives an advantageous effect to the user in the game process.

(8) The game program further causes the computer to execute selecting any item from among the plurality of items, based on an operation performed by a user. The computer may change the parameter in accordance with the manner item selected from among the plurality of items. The computer may display a marker at a position according to an item that satisfies the condition with respect to the parameter having been changed.

According to the configuration of the above (8), since the position of the marker can be dynamically changed according to a change in the parameter due to the selection of the item, the marker can be displayed at a position according to the current parameter.

(9) The game program may further cause the computer to execute: selecting any item from among the plurality of items, based on an operation performed by the user; and generating a game object indicated by the selected item, or strengthening the game object.

According to the configuration of the above (9), it is possible to provide a user interface that enables the user to easily display a part, desired by the user, of the item group image used for generating or strengthening the game object.

(10) A condition value for the parameter to satisfy the condition may be set for each of the plurality of items.

According to the configuration of the above (10), even when the condition varies from item to item, it is possible to provide a user interface that enables the user to easily display a desired part by displaying a marker at a position according to the item that satisfies the condition.

(11) The computer may display the marker and the knob so as to be distinguishable from each other even when a part of the marker overlaps at least a part of the knob.

According to the configuration of the above (11), visibility of the marker can be enhanced.

The present specification discloses an information processing apparatus, a server, and an information processing system each including the entirety or a part of the means described in the above (1) to (11). Further, the present specification discloses a game processing method for executing the processes described in the above (1) to (11) in the information processing system.

According to the storage medium, the information processing system, the information processing apparatus, and the game processing method, the user can easily cause a desired part of the content to be displayed.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

1. Configuration of Information Processing System

Figure 1:
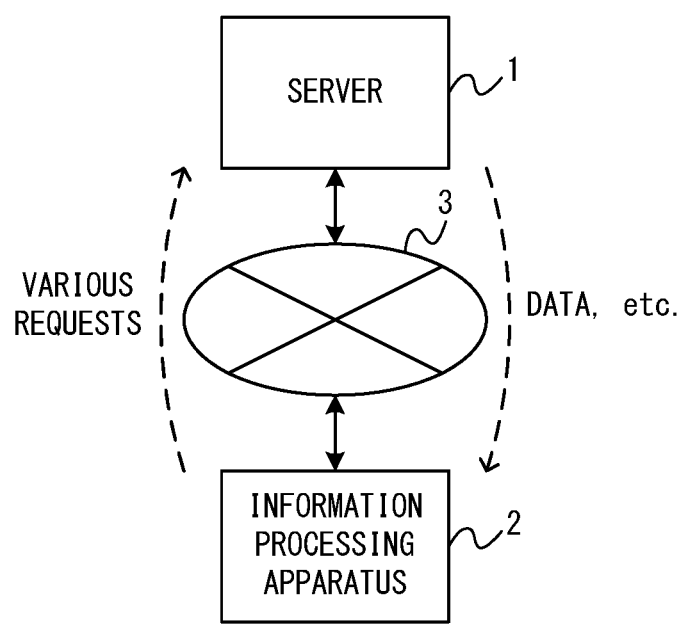
FIG. 1 is a block diagram showing an example of a configuration of a non-limiting information processing system according to an embodiment.

Hereinafter, an information processing system, an information processing apparatus, a game program, and a game processing method according to the present embodiment will be described. Firstly, description will be given of the overall configuration of the information processing system and the configurations of the information processing apparatus and a server included in the information processing system according to the present embodiment. FIG. 1 is a block diagram showing an example of the configuration of the information processing system according to the present embodiment. As shown in FIG. 1, the information processing system includes a server 1 and an information processing apparatus 2. The server 1 and the information processing apparatus 2 are connectable to a network 3, such as the Internet and/or a mobile communication network, wirelessly and/or via wires. The server 1 and the information processing apparatus 2 are communicable with each other via the network 3.

The server 1 is a server for providing services related to an application (specifically, a game application) to be executed in the information processing apparatus 2. In the present embodiment, the server 1 is a game server for a game to be executed in the information processing apparatus 2, and provides an environment for a game process to be executed in the information processing apparatus 2. For example, in response to a request from the information processing apparatus 2 that executes the game process, the server 1 executes a game process according to need, and transmits, to the information processing apparatus 2, data complying with the request (refer to FIG. 1).

The information processing apparatus 2 is an example of a terminal device possessed by a user. Examples of the information processing apparatus 2 include a smart phone, a hand-held or stationary game apparatus, a mobile phone, a tablet terminal, a personal computer, and a wearable terminal. The information processing apparatus 2 is able to execute a game program (in other words, a game application) for a game for which the server 1 provides services.

(Specific Example of Configuration of Server 1)

Figure 2:
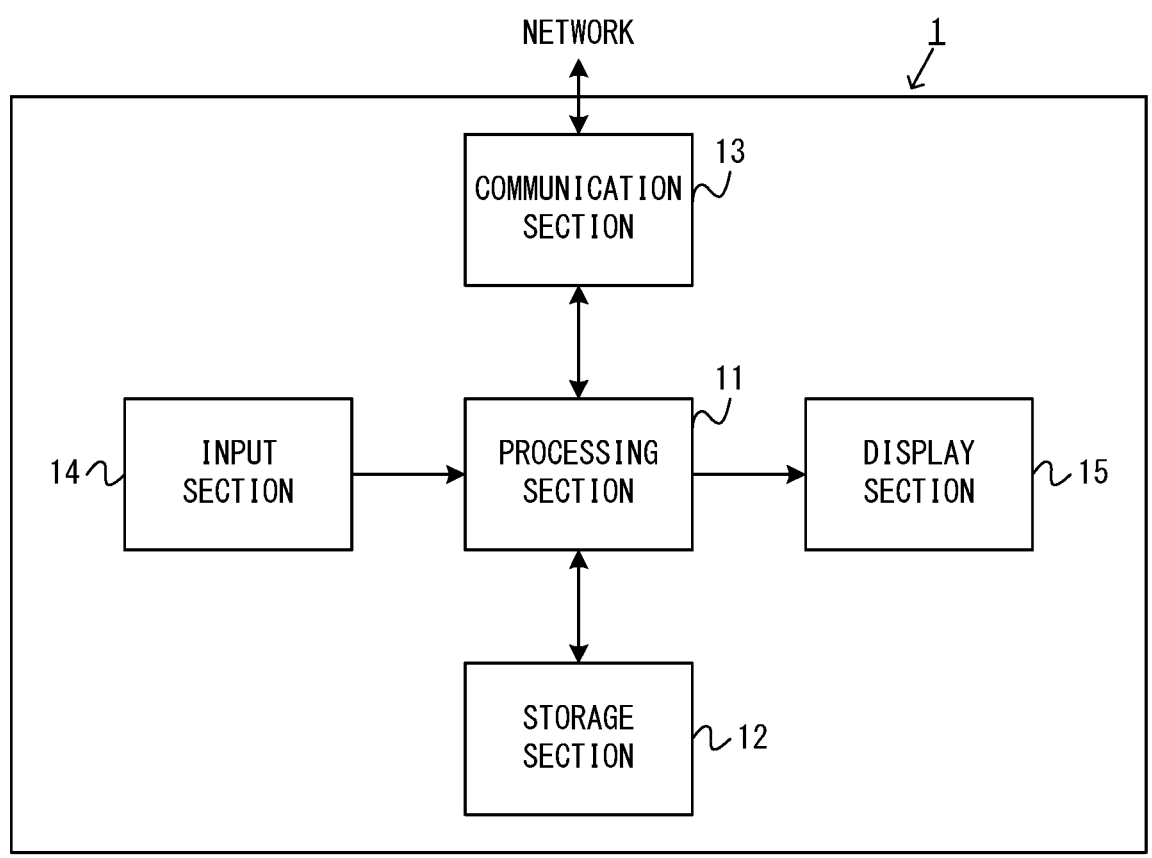
FIG. 2 is a block diagram showing an example of a configuration of a non-limiting server.

FIG. 2 is a block diagram showing an example of the configuration of the server 1. In FIG. 2, each of components included in the server 1 is implemented by one or more information processing apparatuses. In this specification, the "server" means one information processing apparatus (i.e., a server apparatus). When the function of the server is implemented by a plurality of server apparatuses, the "server" means the entirety of a server apparatus group (i.e., a server system). That is, the "server" may be a server apparatus or a server system. When a plurality of information processing apparatuses are included in the server system, these information processing apparatuses may be arranged in the same place or different places. The hardware configuration of the server 1 of the present embodiment may be the same as that for a conventional server.

As shown in FIG. 2, the server 1 includes a processing section 11 and a storage section 12. The processing section 11 is electrically connected to the components 12 to 15 of the server 1. The processing section 11 includes a CPU (Central Processing Unit, in other words, a processor) and a memory. In the server 1, the CPU executes, using the memory, programs stored in the storage section 12, thereby executing various kinds of information processing. The storage section 12 is any storage device (also referred to as "storage medium") that is accessible to the processing section 11. The storage section 12 stores therein programs to be executed in the processing section 11, data to be used for information processing by the processing section 11, data obtained through the information processing, etc. In the present embodiment, the storage section 12 stores therein at least a program for a game process that is to be executed on the server side for a game process to be executed in the information processing apparatus 2.

The server 1 includes a communication section 13. The communication section 13 is connected to the network 3, and has a function of communicating with other devices (e.g., the information processing apparatus 2) via the network 3. The server 1 further includes an input section 14 and a display section 15 as input/output interfaces.

(Specific Example of Configuration of Information Processing Apparatus 2)

Figure 3:
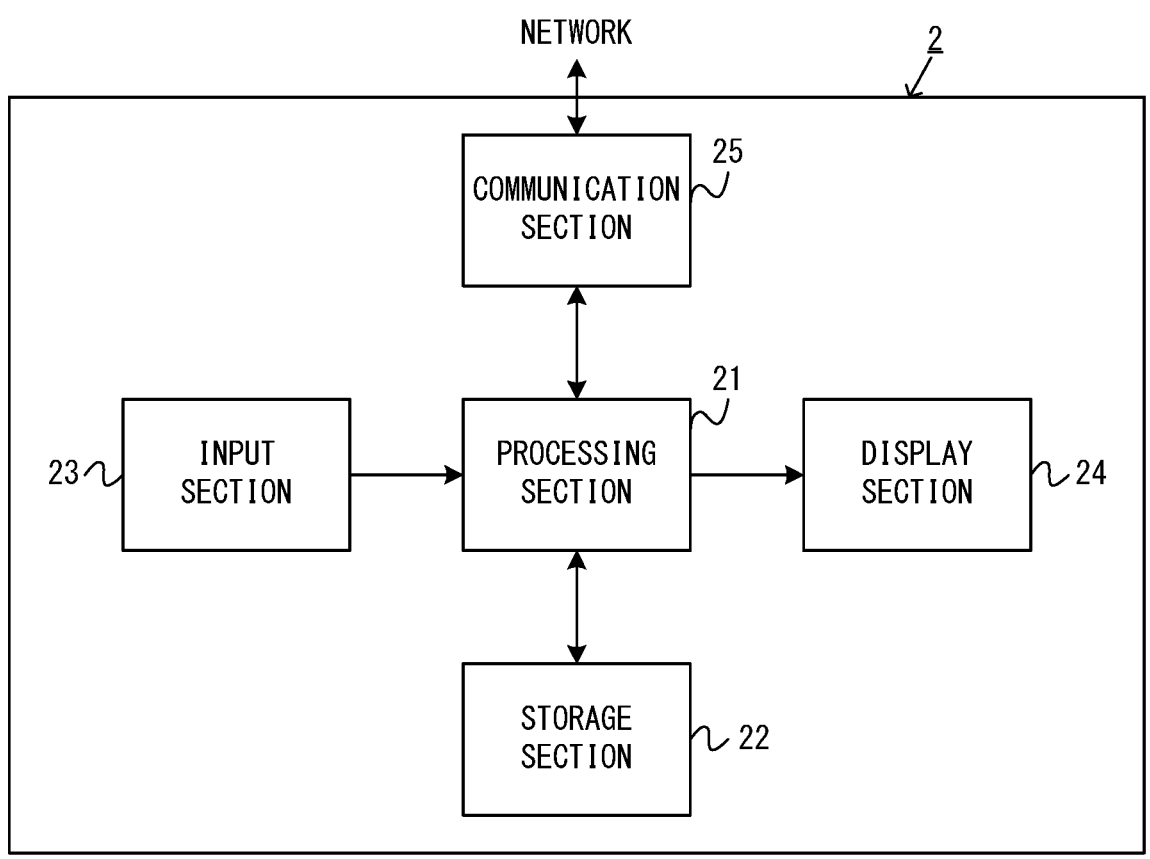
FIG. 3 is a block diagram showing an example of a configuration of a non-limiting information processing apparatus.

FIG. 3 is a block diagram showing an example of the configuration of the information processing apparatus 2. As shown in FIG. 3, the information processing apparatus 2 includes a processing section 21 and a storage section 22. The processing section 21 is electrically connected to the components 22 to 25 of the information processing apparatus 2. The processing section 21 includes a CPU (in other words, a processor) and a memory. In the information processing apparatus 2, the CPU executes, using the memory, a program (specifically, a game program) stored in the storage section 22, thereby executing various kinds of information processing. The storage section 22 stores therein programs to be executed in the processing section 21, data to be used for information processing by the processing section 21, data obtained through the information processing, etc. The storage section 22 may be a storage medium incorporated in a main body unit (specifically, a unit in which the processing section 21 is provided) of the information processing apparatus 2, or may be a storage medium (e.g., a card type storage medium) attachable/detachable with respect to the main body unit.

The information processing apparatus 2 includes an input section 23. The input section 23 may be any input device that receives an input performed by the user. In the present embodiment, the input section 23 includes a touch panel provided on a screen of a display section 24 described later. The input section 23 may include buttons and/or an inertial sensor (e.g., an acceleration sensor or a gyro sensor), etc., in addition to (or instead of) the touch panel. The input section 23 may be an input device provided in the main body unit of the information processing apparatus 2, or may be an input device (e.g., a game controller) separated from the main body unit.

The information processing apparatus 2 includes a display section 24. The display section 24 displays an image (e.g., a game image, etc.) that is generated through information processing executed in the processing section 21 of the information processing apparatus 2. The display section 24 may be a display device provided in the main body unit of the information processing apparatus 2, or may be a display device separated from the main body unit. The information processing apparatus 2 may include a speaker, a microphone, and/or a camera, etc.

The information processing apparatus 2 includes a communication section 25. In the present embodiment, the communication section 25 has a function of performing communication while being connected to a mobile communication network (in other words, a mobile telephone communication network). That is, the information processing apparatus 2 (specifically, the processing section 21) is connected to the network 3 by using the communication section 25 (in other words, through the communication section 25) via the mobile communication network, and communicates with other devices (e.g., the server 1, etc.). The configuration of the communication section, through which the information processing apparatus 2 performs communication via the network 3, is arbitrary. For example, the communication section 25 may have a function of connecting to a wireless LAN through a communication module with Wi-Fi authentication, or may have both the function of connecting to the mobile communication network and the function of connecting to the wireless LAN.

2. Outline of Processing in Information Processing System

Hereinafter, the outline of processing that is executed in the information processing system of the present embodiment will be described. In the present embodiment, the information processing system executes a game process for a simulation game using a game map on which a game character as a unit (in other words, a piece) is caused to fight with an enemy unit. In the present embodiment, a user (in other words, a player of the game) is allowed to place a facility on the game map. The facility, when being placed on the game map, becomes to have a function of recovering or strengthening a player unit or a function of attacking or weakening an enemy unit. Therefore, by generating a facility and placing the facility on the game map, the user can advantageously proceed with the game.

In the present embodiment, a plurality of facilities are prepared in the simulation game. Each of the facilities is classified into any one of a plurality of categories. In the present embodiment, each facility is classified into any of four categories including an offensive facility, a defensive facility, a trap, and a decorative facility. For example, each facility is classified into any of the four categories according to the function of the facility. However, the method of classifying each facility into any of the categories is arbitrary. In another embodiment, each facility may be classified into any of the categories, based on any classification criteria. In still another embodiment, the number of categories may be any number not less than 2.

The offensive facility, the defensive facility, and the trap are game objects each having an advantageous function for the user on the game, whereas the decorative facility has no function on the game (that is, this facility only has a function of decorating the appearance of the game map). Thus, each facility may be a game object that imparts an advantageous effect to the user in the game, or a game object that does not impart such an advantageous effect.

Figure 4:
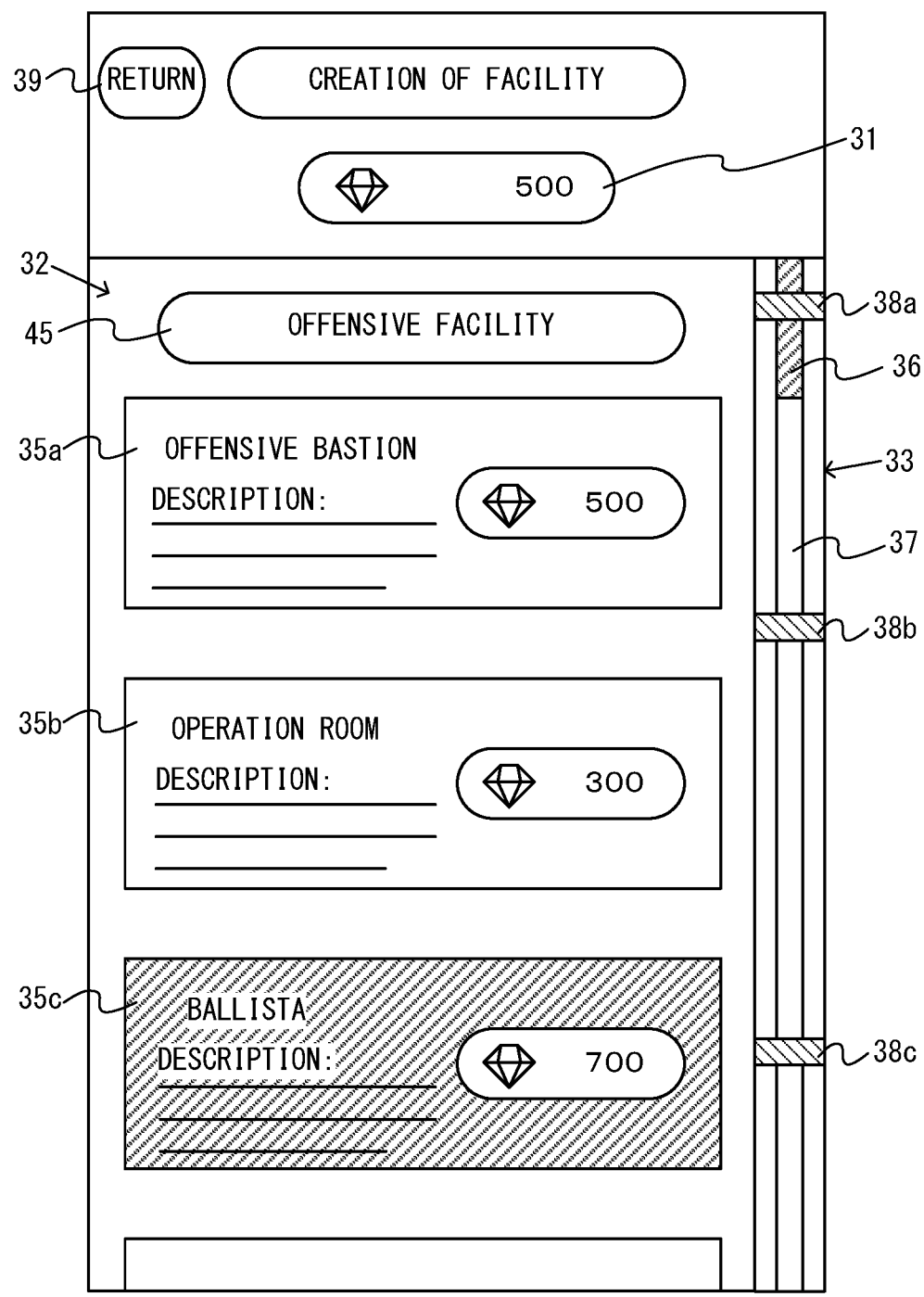
FIG. 4 shows an example of a selection screen displayed on the non-limiting information processing apparatus.

Next, a selection screen for selecting a facility to be generated will be described with reference to FIG. 4 to FIG. 7. FIG. 4 shows an example of a selection screen displayed on the information processing apparatus. In the present embodiment, the information processing apparatus 2 displays the selection screen on the display section 24 in response to a predetermined selection screen display instruction made by the user. For example, the information processing apparatus 2 receives the selection screen display instruction at a menu screen (not shown) in the game application.

As shown in FIG. 4, the selection screen includes a possession number image 31. The possession number image 31 indicates the number of game items (here, jewels) the user currently possesses. The game items will be consumed for generating a facility. In FIG. 4, the possession number image 31 indicates that the user possesses 500 jewels. Although details will be described later, in the present embodiment, a jewel is a game item that is given to the user, based on the result of a game using a game map on which facilities can be placed (step S4 described later).

Further, the selection screen includes an end instruction image 39 (refer to FIG. 4). The end instruction image 39 is a button image that allows an instruction to end display of the selection screen. That is, in response to an operation of designating the end instruction image 39 performed by the user, the information processing apparatus 2 ends display of the selection screen and displays the menu screen on the display section 24.

(Item Group Image)

As shown in FIG. 4, the selection screen includes an item group image 32. The item group image 32 is an image including a plurality of items respectively indicating the plurality of facilities prepared. In the example shown in FIG. 4, the item group image 32 includes three items 35 (specifically, items 35a to 35c). The item 35a indicates an offensive bastion, the item 35b indicates an operation room, and an item 35c indicates a catapult. These facilities are all classified into "offensive facility".

One item 35 indicates information regarding one facility. As shown in FIG. 4, in the present embodiment, each item 35 indicates: the name of the corresponding facility (e.g., "offensive bastion", "operation room", or the like); description for the facility (e.g., description for the function of the facility); and a condition (referred to as "generation condition") for generating the facility. In the present embodiment, the generation condition is indicated as the number of jewels (e.g., "500" in the item 35a shown in FIG. 4) to be consumed in exchange for generation of the facility. The content of the information regarding the facility, which is indicated by the item, is arbitrary.

In the present embodiment, each item 35 indicates a facility to be newly generated. However, if a facility can be strengthened (e.g., the level of a facility can be increased), an item 35 may indicate the facility to be strengthened. In this case, the item 35 may indicate: the name of the facility; description for the facility; and a condition for strengthening the facility (e.g., the number of jewels to be consumed in exchange for the strengthening). The condition for strengthening a facility may be set for each of levels of the facility in such a manner that the number of jewels to be consumed increases as the level of the facility increases, for example. The item group image 32 may include both the item indicating a facility to be generated and the item indicating a facility to be strengthened.

In the present embodiment, a condition for generating a facility is set for each facility. That is, a condition value (i.e., the number of jewels to be consumed in exchange for generation of a facility) for a parameter (i.e., the number of jewels possessed by the user) related to the game to satisfy the generation condition is set for a plurality of items. Therefore, in the present embodiment, depending on the number of jewels currently possessed by the user, there will be a facility that can be generated (i.e., a facility whose generation consumes jewels not greater in number than the jewels currently possessed by the user), and a facility that cannot be generated (i.e., a facility whose generation consumes jewels greater in number than the jewels currently possessed by the user). For example, in the example shown in FIG. 4, since the number of jewels possessed by the user is 500, it is possible to generate the defensive bastion for which 500 jewels will be consumed and the operation room for which 300 jewels will be consumed. Meanwhile, it is not possible to generate the catapult for which 700 jewels will be consumed.

In the present embodiment, the information processing apparatus 2 displays the items 35 in different display forms (specifically, in different colors (including brightness), sizes, shapes, and/or patterns) depending on whether generation thereof is possible or impossible. Specifically, the item that cannot be generated (e.g., the item 35c shown in FIG. 4) is displayed in a background color (with hatched lines in FIG. 4) different from the background color of the items that can be generated (e.g., the items 35a and 35b shown in FIG. 4). Thus, the information processing apparatus 2 can present the facilities that can be currently generated and the facility that cannot be currently generated, in an easy-to-understand manner to the user.

In the present embodiment, one type of a game item (i.e., jewel) is used for generating facilities. In another embodiment, a plurality of types of game items may be used for generating facilities. For example, a first type of jewel may be used for generating a certain facility, and a second type of jewel may be used for generating a facility different from the certain facility. In this case, the condition for giving the first type of jewel to the user and the condition for giving the second type of jewel to the user may be the same or different from each other.

Figure 5:
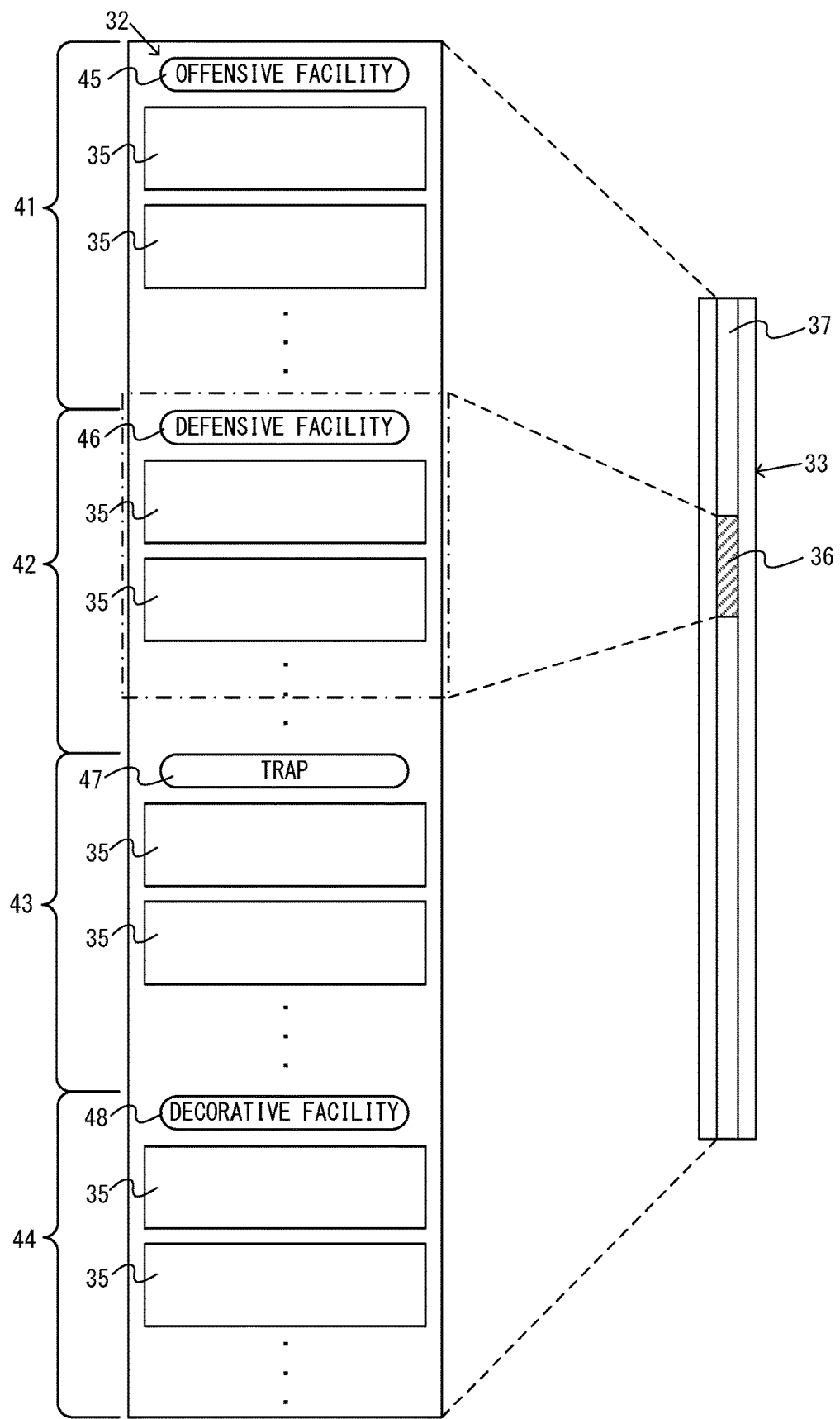
FIG. 5 shows an example of a relationship between an item group image and a scrollbar.

As shown in FIG. 4, a part of the item group image 32 is displayed on the display section 24. That is, in the present embodiment, the item group image 32 is larger than a display area, in the display section 24, for displaying the item group image 32. The entire item group image 32 is shown in FIG. 5. FIG. 5 shows an example of a relationship between the item group image 32 and a scrollbar 33. In FIG. 5, a marker 38 described later is not shown.

As shown in FIG. 5, the item group image 32 is longer than the display area in a predetermined direction (here, up-down direction), and therefore is displayed so as to be scrollable in the direction in the display section 24. In the item group image 32, a plurality of items 35 indicating facilities are arrayed in the predetermined direction (in other words, scroll direction).

In the present embodiment, in the item group image 32, items assigned to the same category are collectively arranged. That is, as shown in FIG. 5, in the item group image 32, items 35 indicating offensive facilities are collectively placed in an area 41, items 35 indicating defensive facilities are collectively placed in an area 42, items 35 indicating traps are collectively placed in an area 43, and items 35 indicating decorative facilities are collectively placed in an area 44. In the present embodiment, the respective categories are arranged in order of "offensive facility", "defensive facility", "trap", and "decorative facility" from the top.

The order in which the respective items 35 are arranged in one category is arbitrary. The order in which the respective categories are arranged in the item group image 32 is also arbitrary. These orders may be fixed or variable. For example, the information processing system may have a function of rearranging the respective items in an order instructed by the user.

In the present embodiment, the item group image 32 includes images 45 to 48 indicating the names of the categories before (in other words, above) the respective items 35 classified into the corresponding categories. That is, as shown in FIG. 5, the image 45 indicating "offensive facility" is placed before the items 35 indicating offensive facilities, the image 46 indicating "defensive facility" is placed before the items 35 indicating defensive facilities, the image 47 indicating "trap" is placed before the items 35 indicating traps, and the image 48 indicating "decorative facility" is placed before the items 35 indicating decorative facilities. This allows the user to recognize the categories into which the respective items 35 are classified.

As described above, a part of the item group image 32 is displayed on the display section 24. Therefore, the user scrolls the item group image 32 on the screen of the display section 24 to cause a desired part (i.e., a part that the user desires to see) of the item group image 32 to be displayed. In the present embodiment, the user can scroll the item group image 32 by using the scrollbar.

(Scrollbar)

As shown in FIG. 4, the selection screen includes the scrollbar 33. The scrollbar 33 has a shape extending in the direction (here, up-down direction) along which the item group image 32 is scrollable (refer to FIG. 4F). In the present embodiment, the scrollbar 33 is placed adjacent to a side (specifically, right side) of the item group image 32. The scrollbar 33 may be placed near the item group image 32 without being in contact with the item group image 32.

As shown in FIG. 4, the scrollbar 33 includes a knob 36 and a track area 37. The knob 36 indicates a part, of the item group image 32, to be displayed (hereinafter this part is referred to as "display target part"). The track area 37 indicates an area where the knob 36 is movable. In the present embodiment, the knob 36 is movable up and down on the track area 37 that extends in the up-down direction. The user can change (specifically, scroll) the display target part by moving the knob 36 on the track area 37.

As shown in FIG. 5, the track area 37 corresponds to the entirety of the item group image 32, and the knob 36 corresponds to the display target part (a part surrounded by an alternate long and short dash line in FIG. 5) of the item group image 32. That is, the knob 36 is placed such that the position of the knob 36 on the track area 37 corresponds to the position of the display target part of the item group image 32. In other words, the display target part is changed according to movement of the knob 36 such that the position of the knob 36 on the track area 37 corresponds to the position of the display target part of the item group image 32.

Regarding the lengths in the scroll direction, the length of the track area 37 corresponds to the length of the item group image 32, and the length of the knob 36 corresponds to the length of the display target part. That is, the length of the knob 36 is set such that the ratio of the length of the knob 36 to the length of the track area 37 is equal to the ratio of the length of the display target part to the length of the item group image 32. However, in another embodiment, the length of the knob 36 need not strictly correspond to the length of the display target part. The knob 36 may be set such that the position of the knob 36 on the track area 37 indicates the position of the display target part of the item group image 32 with a certain degree of accuracy.

In the present embodiment, the user is allowed to perform an operation (hereinafter referred to as "display change operation") of changing the display target part of the item group image 32 by using the scrollbar 33. Specifically, in response to a drag operation with the position of the knob 36 being a touch start position, the information processing apparatus 2 moves, on the track area 37, the knob 36 to a touch position during the drag operation. In addition, in response to an operation of touching a position on the track area 37, the information processing apparatus 2 moves the knob 36 to the touched position. In response to the movement of the knob 36, the information processing apparatus 2 moves the display target part to a position corresponding to the position of the knob 36. Thus, the item group image 32 is scrolled and displayed.

Although the knob 36 indicates the display target part as described above, the knob 36 need not indicate the display target part strictly in real time. For example, in the case where the knob 36 is moved by a drag operation, the display target part may not be moved even when the knob 36 is moved during the drag operation. In response to the drag operation having been ended, the information processing apparatus 2 may cause the display target part to move from the position at the start of the drag operation to the position based on the position of the knob 36 at the end of the drag operation.

In the present embodiment, the user can perform the display change operation also by an operation to the item group image 32 as well as the operation to the scrollbar 33. Specifically, the information processing apparatus 2 scrolls the display target part in the up-down direction in response to a swipe operation or a drag operation having been performed in the up-down direction on the item group image 32. At this time, in response to the display target part having been scrolled, the knob 36 is moved to the position corresponding to the position of the display target part.

In another embodiment, the information processing apparatus 2 may receive only one of the display change operation performed to the scrollbar 33 and the display change operation performed to the item group image 32. In other words, the scrollbar 33 may have a function as an operation image that allows an operation to the scrollbar 33, or may have merely a function as a mark indicating the position of the display target part of the item group image 32.

The user is allowed to select a facility to be generated through an operation of designating an item 35. The operation of designating an item 35 is, for example, a touch operation to a position on the item 35, in which the distance between a touch start position and a touch end position is not greater than a predetermined value (in other words, an operation that is not determined to be a swipe operation or a drag operation).

As described above, the user is allowed to move the display target part of the item group image 32 through the display change operation to display a desired item, and select a facility to be generated through an operation of designating the displayed item.

In the present embodiment, the item group image 32 is scrollable in the up-down direction, and the scrollbar 33 is configured such that the knob 36 is movable in the up-down direction on the track area 37. In another embodiment, the item group image 32 may be scrollable in the right-left direction, and the scrollbar 33 may be configured such that the knob 36 is movable in the right-left direction on the track area 37.

As shown in FIG. 4, the scrollbar 33 includes a marker 38 (specifically, markers 38a to 38c shown in FIG. 4). The marker 38 is placed at a position, on the scrollbar 33, which depends on the position of an item that satisfies a predetermined condition among the items included in the item group image 32.

Figure 6:
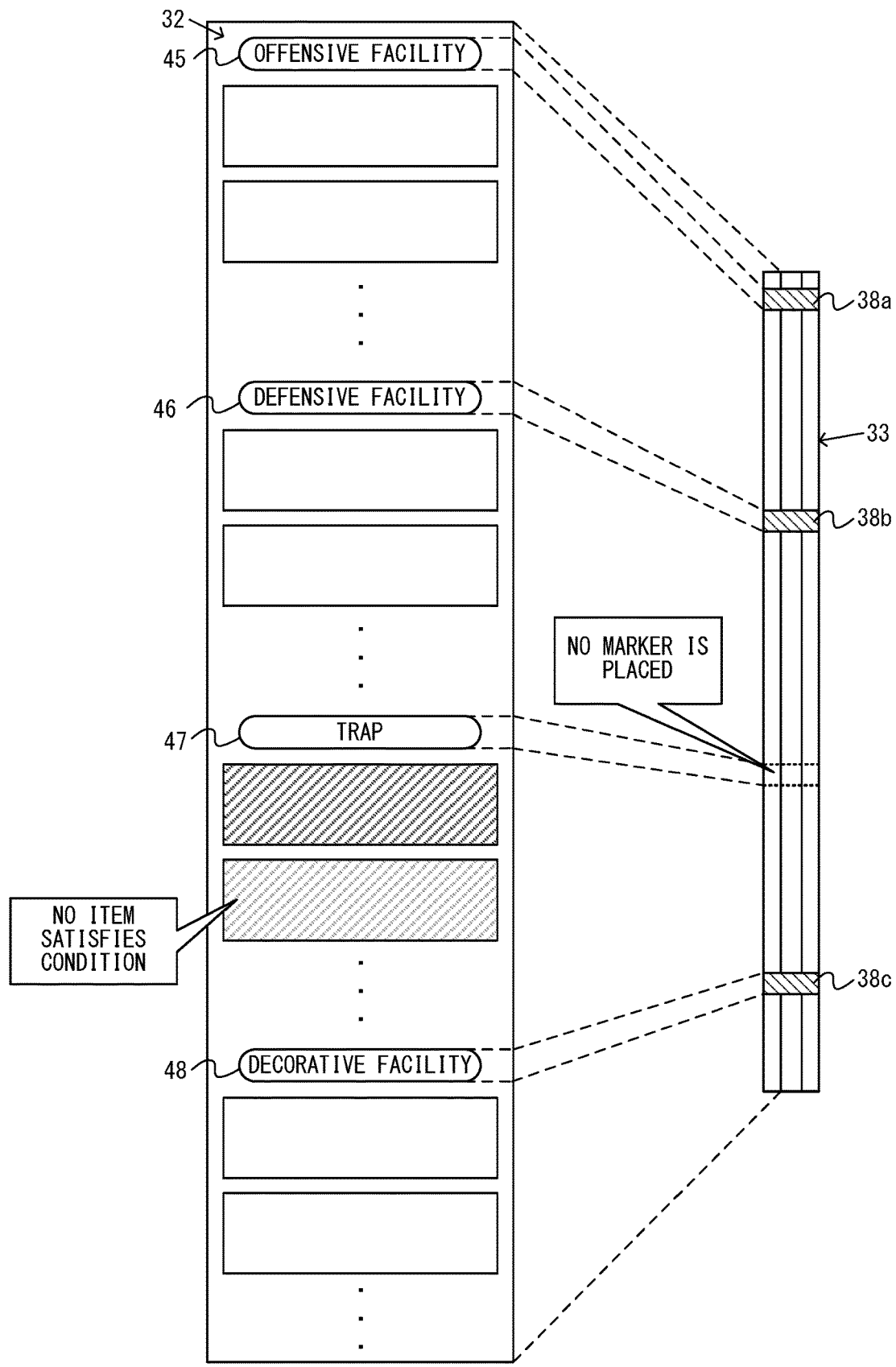
FIG. 6 shows an example of a relationship between the item group image and markers on the scrollbar.

FIG. 6 shows an example of a relationship between the item group image and the markers on the scrollbar (in FIG. 6, the knob 36 is not shown). In the present embodiment, the "predetermined condition" is that the item is an item indicating a facility that can be generated. The "position according to the position of an item that satisfies the predetermined condition" is the "position corresponding to the head position of a category including an item indicating a facility that can be generated". That is, in the present embodiment, regarding a category including an item indicating a facility that can be generated, the marker 38 (in FIG. 6, three markers 38a to 38c) is placed at a position (a position on the scrollbar) corresponding to the position of an image that indicates the name of the category and is placed at the head (i.e., at the top) of the category. In the example shown in FIG. 6, it is assumed that the facilities classified into the category of "trap" include no generable facility, whereas the facilities classified into the categories other than the category of "trap" have at least one generable facility. Therefore, in the example shown in FIG. 6, the markers 38a, 38b, and 38c are placed at the positions corresponding to the positions of the images 45, 46, and 48 indicating the names of the categories other than the category of "trap". Meanwhile, no marker is placed at the position (indicated by dotted lines in FIG. 6) corresponding to the position of the image 47 indicating the name of the category of "trap".

In the present embodiment, the information processing apparatus 2 does not display a marker corresponding to a category including no item that satisfies the predetermined condition. In another embodiment, the information processing apparatus 2 may display a marker corresponding to a category including no item that satisfies the predetermined condition. In this case, the information processing apparatus 2 may use different marker display forms between the category including an item that satisfies the predetermined condition and the category including no item that satisfies the predetermined condition. For example, the information processing apparatus 2 may display the marker corresponding to the category including no item that satisfies the predetermined condition, to be darker than the marker corresponding to the category including an item that satisfies the predetermined condition. As described above, the information processing apparatus 2 may further display a marker at the position indicating the category different from the category including an item that satisfies the condition, in a display form different from that for the marker displayed at the position indicating the category including the item that satisfies the condition. Thus, the user is allowed to recognize the position of the category different from the category in which an item satisfying the condition is present.

As described above, the information processing apparatus 2 displays the marker 38 at the position according to the item that satisfies the condition regarding the parameter (i.e., the number of jewels) related to the game. Thus, the information processing apparatus 2 can display the marker 38 at a part of the item group image, which is assumed to be highly likely to be seen by the user, for example. Thus, convenience in operation using the scrollbar 33 can be improved.

In addition, the marker 38 enables the user to easily grasp the head position of each category on the scrollbar. Therefore, the user can easily cause the part, of the item group image 32, near the head of each category to be displayed by performing the display change operation with the marker 38 as a guide.

Figure 7:
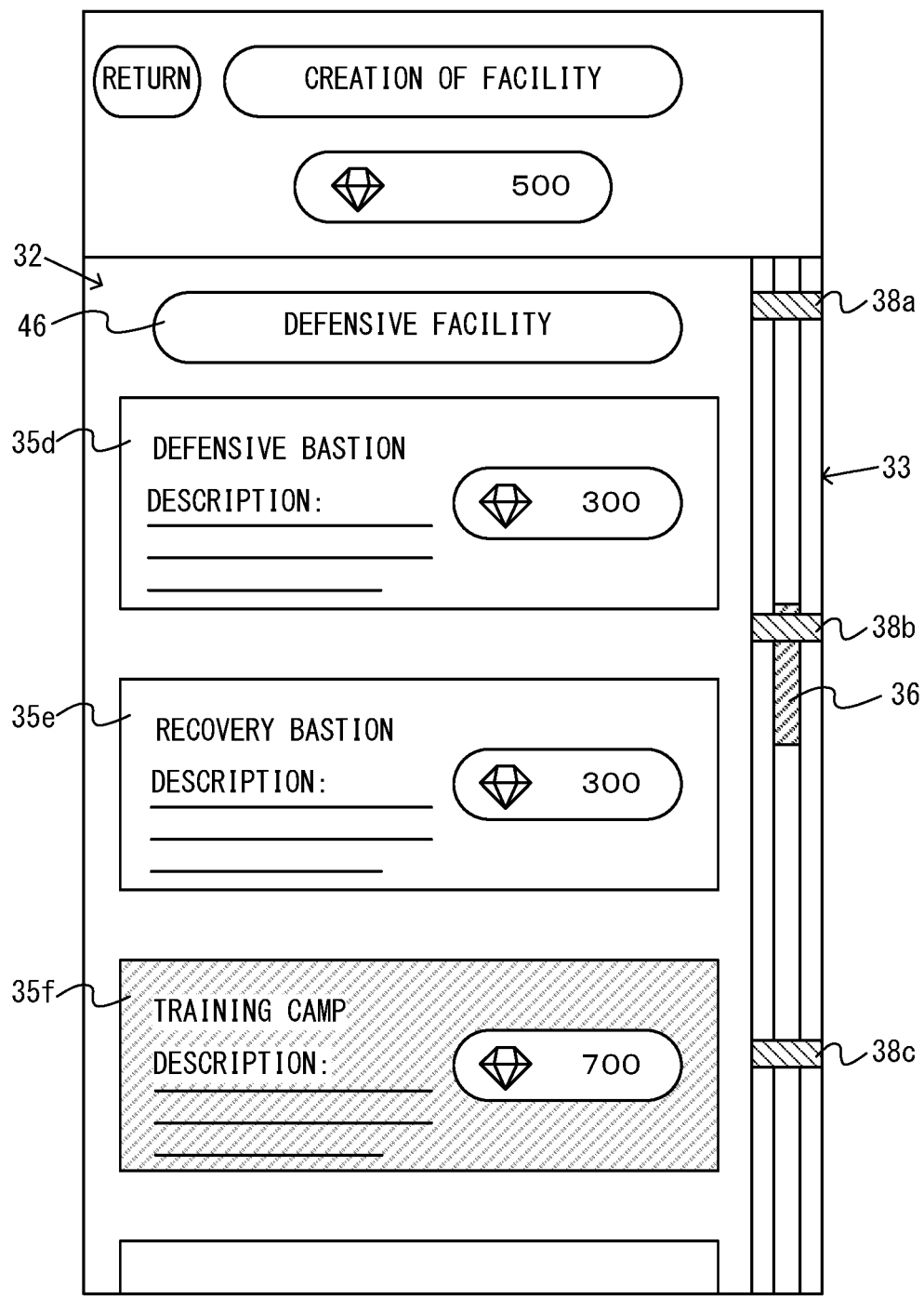
FIG. 7 shows an example of a selection screen obtained after the selection screen shown in FIG. 4 has been subjected to a display change operation.

For example, a case in which the user causes an item indicating a facility included in the category of "defensive facility" to be displayed while the selection screen shown in FIG. 4 is displayed, is considered. In this case, the user performs a display change operation to move the knob 36 to the position of the marker 38b corresponding to the category of "defensive facility". That is, the user performs an operation of dragging the knob 36 to the position of the marker 38b or an operation of touching the position of the marker 38b. FIG. 7 shows an example of the selection screen after the aforementioned display change operation has been performed on the selection screen shown in FIG. 4. In FIG. 7, the knob 36 is moved to the position of the marker 38b (specifically, the position where the knob 36 and the marker 38b overlap each other), whereby a part, of the item group image 32, which includes the image 46 indicating the category name and the items 35d, 35e, and 35f included in the category of "defensive facility", is displayed. Thus, by moving the knob 36 with the marker 38 as a guide, the user can easily cause a part near the head of a desired category to be displayed.

In the case where facilities are classified into categories as in the present embodiment, it is assumed that the user may cause the selection screen to be displayed for the purpose of generating a facility classified into a specific category. According to the present embodiment, the user can easily cause the items of the desired category to be displayed by using the marker 38 as a guide.

In the present embodiment, in a place near an item placed at the head of a category (specifically, a place before this item), an image (any of the images 45 to 48) indicating the name of this category is placed (refer to FIG. 5). Therefore, when a part, of the item group image 32, near the head of each category is displayed, the image indicating the name of the category is also easily displayed. This enables the user to easily recognize a category into which items to be displayed after the display target part has been changed are classified.

Even when a part of the marker 38 overlaps at least a part of the knob 36, the information processing apparatus 2 displays the marker 38 and the knob 36 so as to be distinguishable from each other (refer to FIG. 4 and FIG. 6). This enhances visibility of the marker 38. In the present embodiment, the information processing apparatus 2 makes the marker 38 and the knob 36 distinguishable from each other even in the above case by making the width (i.e., the horizontal length) of the marker 38 greater than the width of the knob 36. In another embodiment, the information processing apparatus 2 may make the marker 38 and the knob 36 distinguishable from each other by making at least one of the color, the pattern, and the shape different between the marker 38 and the knob 36.

In another embodiment, the information processing apparatus 2 may display each marker in a display form according to the category corresponding to the marker. For example, the information processing apparatus 2 may display markers having different colors and/or shapes, etc., for the four categories, respectively. This enables the user to recognize the relationship between each marker and the category corresponding to the marker.

In another embodiment, the information processing apparatus 2 may display each marker in a display form according to the number of items that satisfy the condition (i.e., the generation condition) among the items included in each category. Thus, the marker enables the user to recognize the number of items that satisfy the condition in the category. Alternatively, for example, the information processing apparatus 2 may display each marker in a display form according to the number of items included in each category (refer to FIG. 11 described later). Thus, the marker enables the user to recognize the number of items included in the category.

3. Specific Example of Processing Executed in Information Processing System

Figure 8:
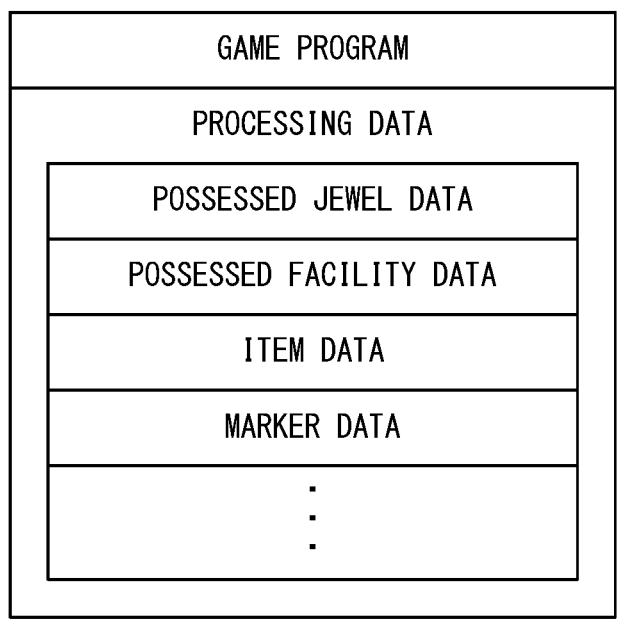
FIG. 8 shows examples of various data used for information processing in the non-limiting information processing system.

Next, a specific example of information processing to be executed in the information processing system according to the present embodiment will be described. Firstly, with reference to FIG. 8, data used for the information processing will be described. FIG. 8 shows examples of various data used for the information processing in the information processing system. The various data shown in FIG. 8 are stored in a memory in the processing section 21 and/or the storage section 22 in the information processing apparatus 2.

As shown in FIG. 8, the information processing apparatus 2 stores therein a game program. The game program is a program for executing the game application of the simulation game according to the present embodiment. In the case where a part of the game process in the game application is executed in the server 1, the server 1 stores therein a game program for the game process to be executed on the server 1 side.

Further, as shown in FIG. 8, the information processing apparatus 2 stores therein at least possessed jewel data, possessed facility data, item data, and marker data, as processing data used for the information processing. In addition to the data shown in FIG. 8, the information processing apparatus 2 stores therein various data (e.g., data regarding the respective units, data of the game map, etc.) used for execution of the game application.

The possessed jewel data indicates the number of jewels possessed by the user. The possessed facility data indicates a facility possessed by the user (i.e., a facility that has been generated and is able to be placed on the map).

The item data indicates information regarding facilities indicated by items. Specifically, the item data includes, for each facility to be prepared, data indicating the name, category, function, and generation condition (specifically, the number of jewels to be consumed in exchange for generation of the facility). In addition, the item data includes data indicating an arrangement order of the items and the images indicating the names of the categories, which are to be placed in the item group image. In the present embodiment, the item data is prepared in advance in the game application.

The marker data indicates the position where a marker is placed on the scrollbar. When a plurality of markers are placed on the scrollbar, the marker data indicates the positions of the respective markers.

The entirety or a part of the data shown in FIG. 8 may be stored in the server 1 as well as in the information processing apparatus 2. The data stored in the server 1 need not be stored in the information processing apparatus 2. In this case, when the information processing apparatus 2 uses the data shown in FIG. 8, the information processing apparatus 2 may acquire the data from the server 1 at an appropriate timing to use the data.

Figure 9:
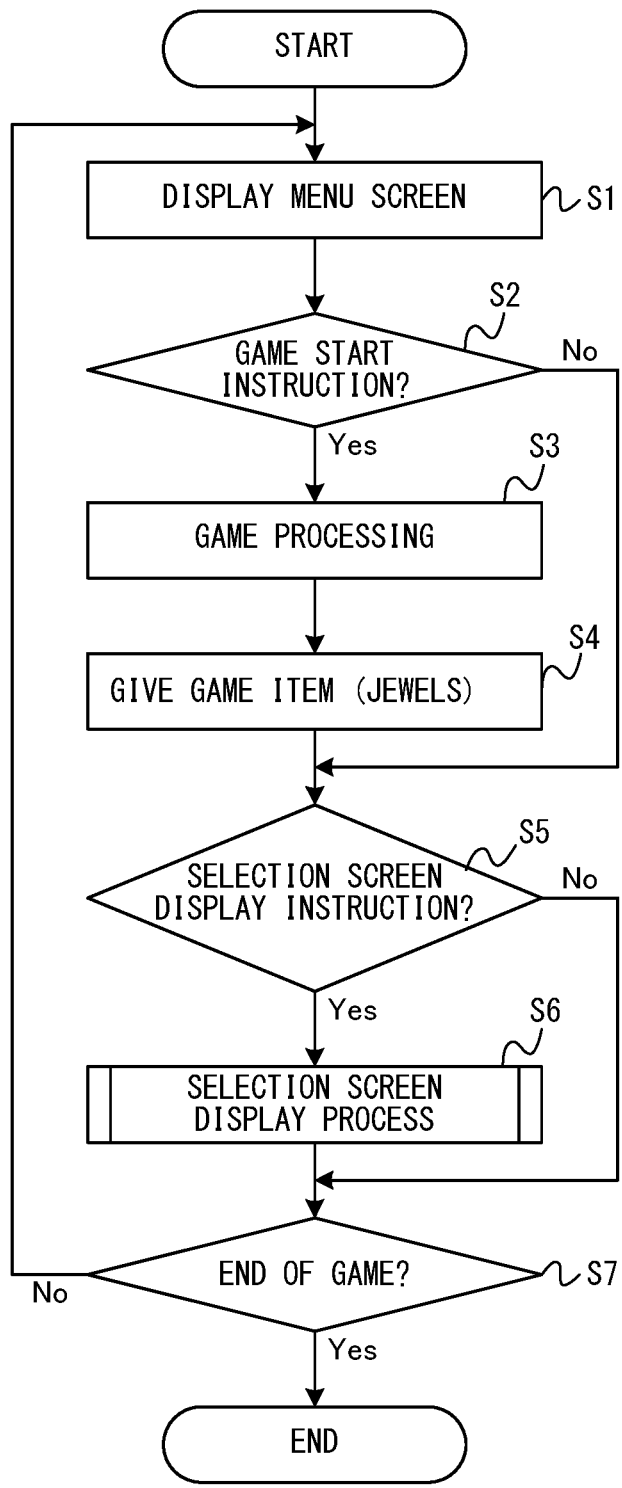
FIG. 9 is a flowchart showing an example of a flow of non-limiting information processing executed by the non-limiting information processing apparatus.
Figure 10:
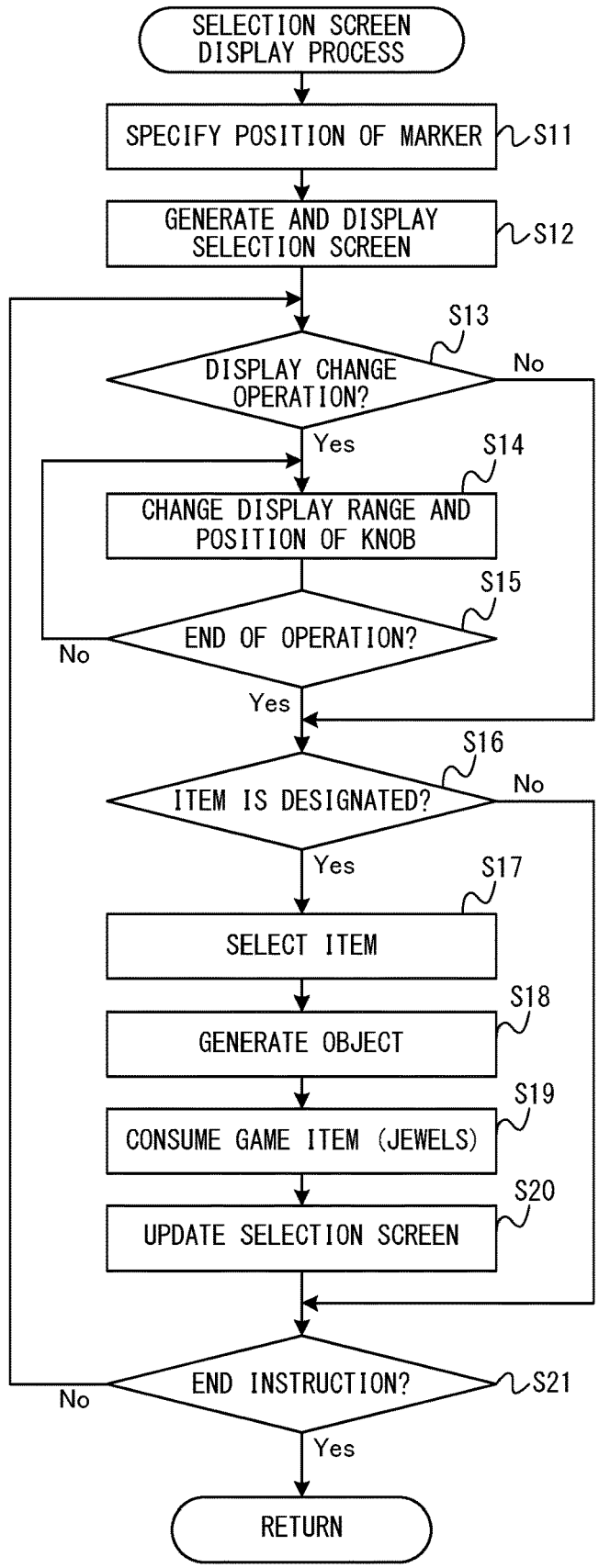
FIG. 10 is a sub flowchart showing an example of a specific flow of a non-limiting selection screen display process.

FIG. 9 and FIG. 10 are flowcharts showing an example of a flow of information processing to be executed by the information processing apparatus 2. A series of process steps shown in FIG. 9 and FIG. 10 are started when the user has made an instruction to start a game mode (referred to as "facility game mode") for performing a game using a game map on which facilities can be placed, after activation of the game program stored in the storage section 22.

In the present embodiment, the CPU (in other words, the processor) of the processing section 21 of the information processing apparatus 2 executes the game program stored in the storage section 22 to execute the processes in the steps shown in FIG. 9 and FIG. 10. In another embodiment, a part of the processes in the steps may be executed by a processor (e.g., a dedicated circuit or the like) different from the CPU. When the information processing apparatus 2 is communicable with the server 1, a part of the processes in the steps shown in FIG. 9 and FIG. 10 may be executed in the server 1. The processes in the steps shown in FIG. 9 and FIG. 10 are merely examples, and the processing order of the steps may be changed or another process may be executed in addition to (or instead of) the processes in the steps so long as similar results can be obtained.

The processing section 21 of the information processing apparatus 2 executes the processes in the steps shown in FIG. 9 and FIG. 10 by using the memory (or the storage section 22). That is, the CPU of the processing section 21 stores, in the memory, data acquired through each process step, and reads the data from the memory when using the data in the subsequent process steps.

In the series of processes shown in FIG. 9, firstly, in step S1, the processing section 21 causes the display section 24 to display the menu screen in the facility game mode. The specific content of the menu screen is arbitrary. In the present embodiment, with the menu screen being displayed, the processing section 21 receives a game start instruction and a selection screen display instruction from the user. The former is an instruction to start the game using the game map on which facilities can be arranged, and the latter is an instruction to display the selection screen. For example, the processing section 21 causes the display section 24 to display the menu screen including a button image representing the game start instruction and a button image representing the selection screen display instruction. The processing section 21 may receive, on the menu screen, instructions other than the above instructions. Next to step S1, the process of step S2 is executed.

In step S2, the processing section 21 determines whether or not the user has made a game start instruction. For example, the processing section 21 determines whether or not an operation of designating the button image, which is included in the menu screen and represents the game start instruction, has been performed. In the present embodiment, when determining whether or not an operation by the user has been performed, the processing section 21 acquires, from the input section 23, data indicating the operation performed to the input section 23, and determines presence/absence of the operation and the content of the operation, based on the acquired data. When the determination result in step S2 is positive, the process in step S3 is executed. When the determination result in step S2 is negative, the process in step S5 described later is executed.

In step S3, the processing section 21 executes a game process for performing a game in the facility game mode. The specific content of the game process is arbitrary. For example, the processing section 21 executes a game process of moving a player unit on the game map, based on an operation performed by the user, and moving an enemy unit according to a predetermined algorithm. The processing section 21 may place a facility possessed by the user on the game map according to an instruction of the user. When the game has ended in step S3, the process in step S4 is executed.

The facility used in the game process in step S3 may be a facility that is classified into a category (e.g., offensive facility) among the four categories described above. At this time, a facility classified into a category (e.g., defensive facility) that is not used in the game process is used in another game process different from the game process. For example, the facility classified into the defensive facility may be used in a game process (specifically, a game process equivalent to the game process in step S3) that is executed in an information processing apparatus of another user. That is, in the game process in step S3, a game in which the offensive facility of the user is placed on a game map where the defensive facility of the other user has been placed (i.e., a game in which the user is on the offensive side) may be performed, whereas, in the game process in step S3 performed by the information processing apparatus of the other user, a game using a game map where a defensive facility of the user is placed (i.e., a game in which the user is on the defensive side) may be performed. Data of the game map where the defensive facility is placed may be stored in the server 1 so as to be usable by the other information processing apparatus 2.

In step S4, the processing section 21 gives jewels to the user, based on the result of the game executed in step S3. Specifically, the processing section 21 updates the value indicated by the possessed jewel data stored in the storage section 22, to a value indicating a number obtained by adding the number of the newly given jewels to the number of the jewels currently possessed by the user. The condition for giving jewels to the user is arbitrary. The "result of the game" means to include not only the content of the game but also the fact that the game has been played. That is, the condition for giving jewels may be that the game has been played, that the user has won in the game, or that a game condition (e.g., defeating a predetermined number of enemy units) has been satisfied in the game. The number of jewels to be given according to the condition is arbitrary. For example, the processing section 21 may set a plurality of conditions for giving jewels, and may set, for each condition, the number of jewels to be given when the condition is satisfied. Next to the process in step S4, the process in step S5 is executed.

As described above, in the present embodiment, a game item (i.e., jewels) to be consumed for generating a game object (i.e., a facility) indicated by an item in the item group image is given based on the result of the game process. In another embodiment, the game item may be a game item that is given to the user by charging.

In step S5, the processing section 21 determines whether or not the user has made a selection screen display instruction. For example, the processing section 21 determines whether or not an operation of designating the button image, which is included in the menu screen and indicates the selection screen display instruction, has been performed. When the result of the determination in step S5 is positive, the process in step S6 is executed. When the result of the determination in step S5 is negative, the process in step S7 is executed.

In step S6, the processing section 21 executes a selection screen display process. The selection screen display process is a process of causing the display section 24 to display the selection screen, and receiving a facility generation instruction from the user. Hereinafter, the specific flow of the selection screen display process will be described with reference to FIG. 10.

FIG. 10 is a sub flowchart showing an example of the specific flow of the selection screen display process. In the selection screen display process, firstly, in step S11, the processing section 21 specifies the position of a marker to be placed on the scrollbar 33. Specifically, the processing section 21 firstly specifies a facility that satisfies the generation condition among the facilities indicated by the items included in each category. Then, the processing section 21 determines, for each category, whether or not the category includes the specified facility. The facility specification and the category determination described above can be performed based on the possessed jewel data and the item data stored in the storage section 22. Next, the processing section 21 specifies the position of the image indicating the name of the category that includes the facility satisfying the generation condition. The processing section 21 specifies the position of the image (specifically, the position on the item group image 32) with reference to the item data stored in the storage section 22. Further, the processing section 21 specifies a position, on the scrollbar 33, corresponding to the specified position, as a position where the marker is to be placed. The processing section 21 stores, in the storage section 22, data indicating the specified marker position as the marker data. Next to the process in step S11, the process in step S12 is executed.

In step S12, the processing section 21 generates the aforementioned selection screen (refer to FIG. 4), and causes the display section 24 to display the selection screen. That is, the processing section 21 generates the selection screen including the item group image 32 and the scrollbar 33, and causes the display section 24 to display the selection screen. The item group image 32 is generated based on the item data stored in the storage section 22. The processing section 21 need not generate the entirety of the item group image 32, and may generate at least an image, within the display target part, of the item group image 32. In addition, the position of the marker 38 on the scrollbar 33 is determined according to the position indicated by the marker data stored in the storage section 22. Next to the process in step S12, the process in step S13 is executed.

As described above, the information processing apparatus 2 performs the predetermined game process based on the operation performed by the user (step S3), and changes the parameter (i.e., the number of jewels) related to the generation condition, based on the result of the game process (step S4). Thus, the user becomes able to generate a new facility by playing the game using the game map, and therefore can be motivated to play the game.

The parameter may be any parameter available for determination of the placement condition. For example, in another embodiment, the parameter may be a parameter indicating the physical strength of a player character. Alternatively, the parameter may be a parameter that increases in exchange for generation of a facility (e.g., a parameter indicating power that the player character has consumed for generating a facility). At this time, in step S3, the processing section 21 may change the parameter so as to decrease the value indicated by the parameter.

In the present embodiment, the process in step S12 is executed after the processes in steps S3 and S4, whereby the scrollbar 33 on which the marker 38 is placed according to the parameter is displayed. That is, the marker 38 is displayed at the position according to the item that satisfies the generation condition with respect to the parameter having been changed. Therefore, in the present embodiment, placement of the marker is changed as the game status (specifically, generable facility) is changed according to the game play. That is, the information processing apparatus 2 can dynamically change the arrangement state of the marker in accordance with the game status.

In step S13, the processing section 21 determines whether or not the aforementioned display change operation has been started by the user. When the result of the determination in step S13 is positive, the process in step S14 is executed. When the result of the determination in step S13 is negative, the process in step S16 described later is executed.

In step S14, in response to the display change operation, the processing section 21 changes the display target part of the item group image 32 and the position of the knob 36 on the scrollbar 33. That is, the processing section 21 changes the display target part and the position of the knob 36 in accordance with the method described in the above "(Scrollbar)". Next to the process of step S14, the process of step S15 is executed.

In step S15, the processing section 21 determines whether or not the display change operation, which was determined to be started in step S13, has been ended. That is, the processing section 21 determines whether or not a touch input for the display change operation has been ended (in other words, whether or not a touch-off has been made). When the result of the determination in step S15 is positive, the process in step S16 is executed. When the result of the determination in step S15 is negative, the process in step S14 is executed again. That is, while the display change operation is being performed, the processing section 21 repeatedly performs the processes in steps S14 and S15 (e.g., at a rate of once every predetermined time). Thus, the display target part of the item group image 32 and the knob 36 on the scrollbar 33 are moved according to the drag operation or the swipe operation as the display change operation.

In step S16, the processing section 21 determines whether or not a designation operation of designating an item in the item group image 32 has been performed. That is, the processing section 21 determines whether or not an operation of designating an item (e.g., an operation of touching the item) that satisfies the generation condition among the items displayed on the display section 24, has been performed. When the result of the determination in step S16 is positive, the process in step S17 is executed. When the result of the determination in step S16 is negative, the process in step S21 described later is executed.

In step S17, the processing section 21 selects the item designated through the designation operation from among the items included in the item group image 32. Next to the process in step S17, the process in step S18 is executed.

In step S18, the processing section 21 generates the facility indicated by the selected item. That is, the processing section 21 updates the possessed facility data stored in the storage section 22 so as to include data indicating the facility indicated by the selected item. In step S18, the processing section 21 may execute a process of placing the generated facility on the game map in accordance with an instruction of the user. Next to the process in step S18, the process in step S19 is executed.

As described above, the information processing apparatus 2 selects any one of the plurality of items, based on the operation performed by the user (step S17), and generates the facility indicated by the selected item (step S18). In the case where the item indicates a facility to be strengthened as described above, the information processing apparatus 2 may strengthen the facility indicated by the selected item, in step S18. Thus, in the case where a game object that appears in the game is generated or strengthened, the selection screen can be used as a screen for selecting the game object.

In step S19, the processing section 21 consumes the jewels possessed by the user in exchange for generation of the facility in the process of step S18. Specifically, the processing section 21 subtracts the number of jewels to be consumed in exchange for generation of the facility from the number of jewels possessed by the user. Then, the processing section 21 updates the possessed jewel data stored in the storage section 22 so as to indicate the number after the subtraction. Next to the process in step S19, the process in step S20 is executed.

In step S20, the processing section 21 updates the selection screen displayed on the display section 24. That is, based on the number of jewels having been changed in step S19, the processing section 21 executes the process of specifying the position of the marker to be placed on the scrollbar 33 (i.e., step S11), and the process of generating and displaying the selection screen (step S12). Thus, in some cases, the marker placed on the scrollbar 33 in the selection screen is changed and displayed. Next to the process in step S20, the process in step S21 is executed.

As described above, the information processing apparatus 2 selects any one of the plurality of items, based on the user operation (step S18), and changes the parameter (i.e., the number of jewels) related to the generation condition, in accordance with the selection (step S19). Then, the selection screen, which is generated based on the parameter having been changed, is displayed (step S20). Thus, in the present embodiment, in response to that the parameter is changed because the user has selected an item, the scrollbar 33, in which the marker 38 is placed at the position according to the parameter having been changed, is displayed. Thus, the information processing apparatus 2 can dynamically change the arrangement state of the marker in accordance with the selection of the item.

In step S21, the processing section 21 determines whether or not an instruction to end the selection screen has been made. That is, the processing section 21 determines whether or not an operation of designating the end instruction image 39, which is displayed on the display section 24, has been performed. When the result of the determination in step S21 is negative, the process in step S13 is executed again. Thereafter, the series of processes in steps S13 to S21 are repeatedly executed until the processing section 21 determines in step S21 that an instruction to end the selection screen has been made. When the result of the determination in step S21 is positive, the processing section 21 ends the selection screen display process. After the selection screen display process, the process in step S7 shown in FIG. 9 is executed.

Referring back to FIG. 9, in step S7, the processing section 21 determines whether or not to end the game application. For example, the processing section 21 determines whether or not an instruction to end the game application has been made by the user. When the result of the determination in step S7 is negative, the process in step S1 is executed again. Thereafter, the series of processes in steps S1 to S7 are repeatedly executed until the processing section 21 determines to end the game application in step S7. When the result of the determination in step S7 is positive, the processing section 21 ends the information processing in the game application.

4. Function and Effect of Present Embodiment, and Modifications

According to the embodiment described above, an information processing system (specifically, information processing apparatus 2) includes components as follows:

item display means (steps S12, S14, and S20) configured to cause a display device to display, in a scrollable manner, a part of an item group image including a plurality of items arranged in a predetermined order;

scrollbar display means (steps S12, S14, and S20) configured to cause the display device to display a scrollbar that includes a knob indicating a part, of the item group image, displayed on the display device, and a track area where the knob is removable; and marker display means (steps S12, S14, and S20) configured to display, in association with the scrollbar, a marker at a position according to an item that satisfies a condition regarding a parameter related to a game.

According to the above configuration, the marker allows the user to grasp the position according to the item that satisfies the condition regarding the parameter related to the game, among the items included in the item group image. Thus, the user can perform an operation using the scrollbar with the marker as a guide, and therefore can easily cause a desired part (in other words, a desired item) of the item group image to be displayed.

The "display device" may be integrated with or separated from the information processing apparatus. In the present embodiment, the "display device" is the display section 24 incorporated in the information processing apparatus 2. In another embodiment, the "display device" may be a display device that is separated from and communicable with the information processing apparatus 2.

The phrase "in association with the scrollbar" means to include at least a mode in which the marker is displayed on the scrollbar, a mode in which the marker is displayed adjacent to the scrollbar, and a mode in which the marker is displayed near the scrollbar.

The "condition regarding the parameter related to the game" is that "the item indicates a facility that satisfies the generation condition" in the present embodiment, but the specific content of the condition is arbitrary. For example, as described above, when an item indicates a facility to be strengthened, the condition may be that "the item indicates a facility that satisfies the condition for strengthening". Alternatively, as the condition, for example, a condition that "the item indicates a facility that will provide a great effect when being placed on the game map" may be used. In this case, the condition is determined based on a game parameter regarding the facility (specifically, a parameter indicating the function or effect of the facility).

The "position according to the item that satisfies the condition" may be any position that is determined depending on the item. The "position according to the item that satisfies the condition" means to include "the position indicating a category in which the item satisfying the condition is present", and "the position indicating the item satisfying the condition" as described in the present embodiment (and a modification shown in FIG. 11 described later). For example, in the case where three items satisfy the condition among items classified into a certain category, the information processing apparatus 2 may display, on the scrollbar, three markers respectively indicating the positions of the three items.

(Modification Regarding Marker)

Figure 11:
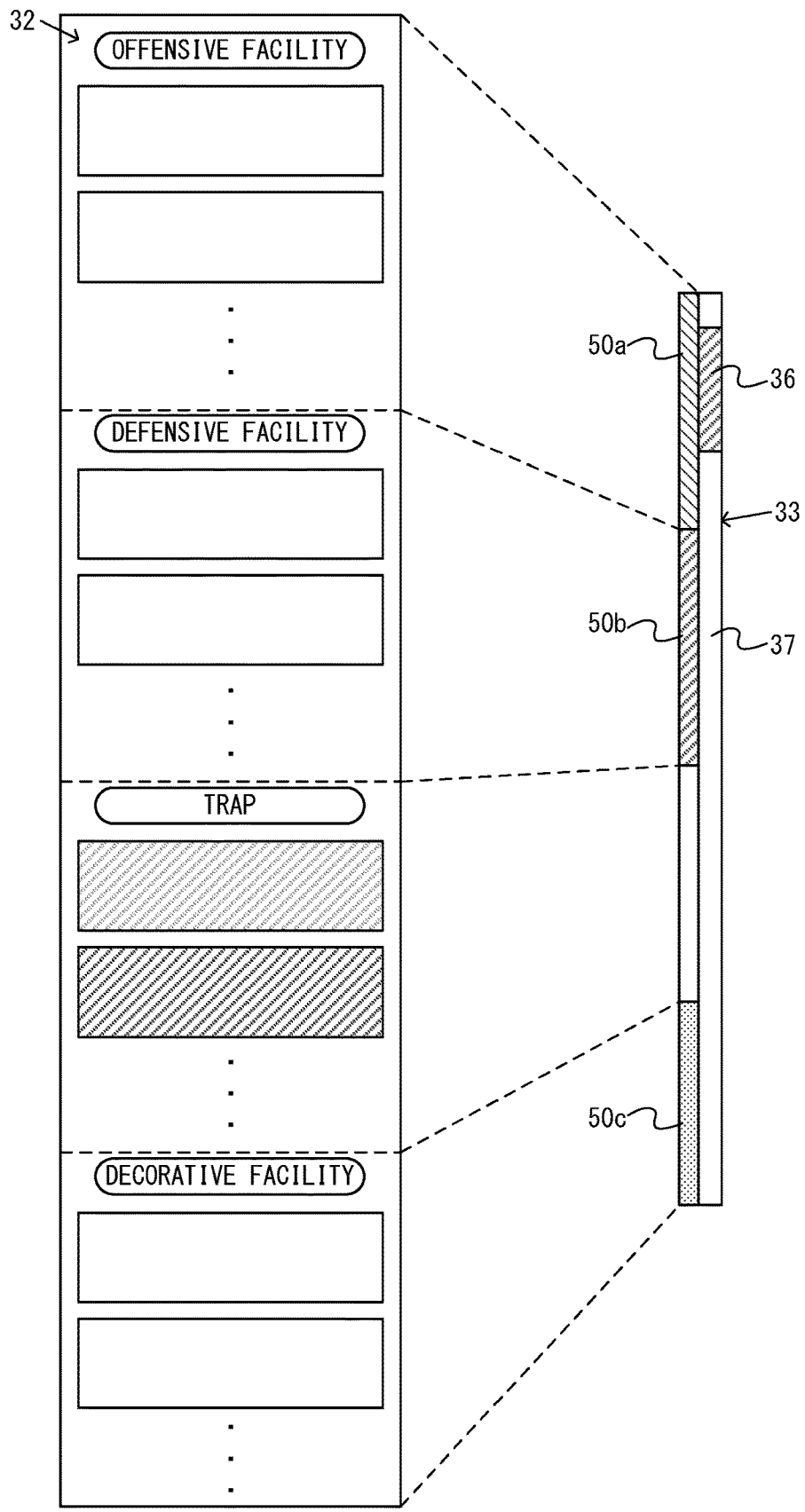
FIG. 11 shows an example of a relationship between an item group image and markers on a scrollbar according to a modification of the embodiment.

FIG. 11 shows an example of a relationship between an item group image and markers on a scrollbar. The item group image 32 shown in FIG. 11 is identical to the item group image 32 shown in FIG. 6.

In the modification shown in FIG. 11, the scrollbar 33 includes three markers 50a to 50c. As shown in FIG. 11, the markers 50a to 50c indicate areas, on the scrollbar 33, corresponding to areas of categories in which items indicating facilities that satisfy a generation condition are present. Specifically, the marker 50a indicates an area of a category of "offensive facility" in the item group image 32. The marker 50b indicates an area of a category of "defensive facility" in the item group image 32. The marker 50c indicates an area of a category of "decorative facility" in the item group image 32. The "area of a category" is an area including at least items classified into this category. In the example shown in FIG. 11, the area of a category includes the items classified into this category, and an image indicating the name of the category. In FIG. 11, a boundary between the area of a category and the area of an adjacent category is indicated by a dashed line.

As shown in FIG. 11, each marker may indicate an area (on the scrollbar 33) corresponding to the area of a category in the item group image 32. Thus, in the information processing apparatus 2, the marker allows the user to grasp the ratio of the area of the category to the item group image 32. For example, by seeing the marker, the user can grasp which category includes more (or less) items classified thereto among a plurality of items included in the item group image 32.

When markers indicate areas corresponding to the areas of categories, a marker corresponding to a certain category may sometimes be displayed in contact with a marker corresponding to another category. For example, in the example shown in FIG. 11, the marker 50a and the marker 50b are displayed in contact with each other. Therefore, in the above case, the information processing apparatus 2 may make the markers corresponding to different categories have at least any of different colors, shapes, and patterns, so that the user can distinguish between the two markers displayed in contact with each other.

In FIG. 11, the markers 50a to 50c are placed adjacent to the track area 37. However, the markers may be placed so as to partially or entirely overlap with the track area 37 as in the aforementioned embodiment, or may be placed adjacent to the track area 37 as in the aforementioned modification. Alternatively, the markers may be placed apart from the track area 37 (to an extent that allows the user to grasp the positional relationship between the markers and the track area). Each marker is placed in a direction, from the item group image 32, substantially perpendicular to the scroll direction of the item group image 32 (refer to FIG. 4 and FIG. 11).

In the case where a plurality of items are assigned to one of a plurality of categories and the items assigned to the same category are collectively arranged in the item group image 32 as in the embodiment and the modification described above, the information processing apparatus 2 displays a marker at a position indicating a category corresponding to an item that satisfies a condition (refer to FIG. 4 and FIG. 11). Thus, the information processing apparatus 2 allows the user to recognize, by using the marker as a guide, the position or the area of the category that conforms to the condition in the item group image 32. In addition, the marker does not individually indicate an item that satisfies the condition but corresponds to the category in which an item that satisfies the condition is present. Therefore, the information processing apparatus 2 can reduce the likelihood of an excessive increase in the number of markers placed on the scrollbar, thereby displaying the markers in an easy-to-view manner.

Figure 12:
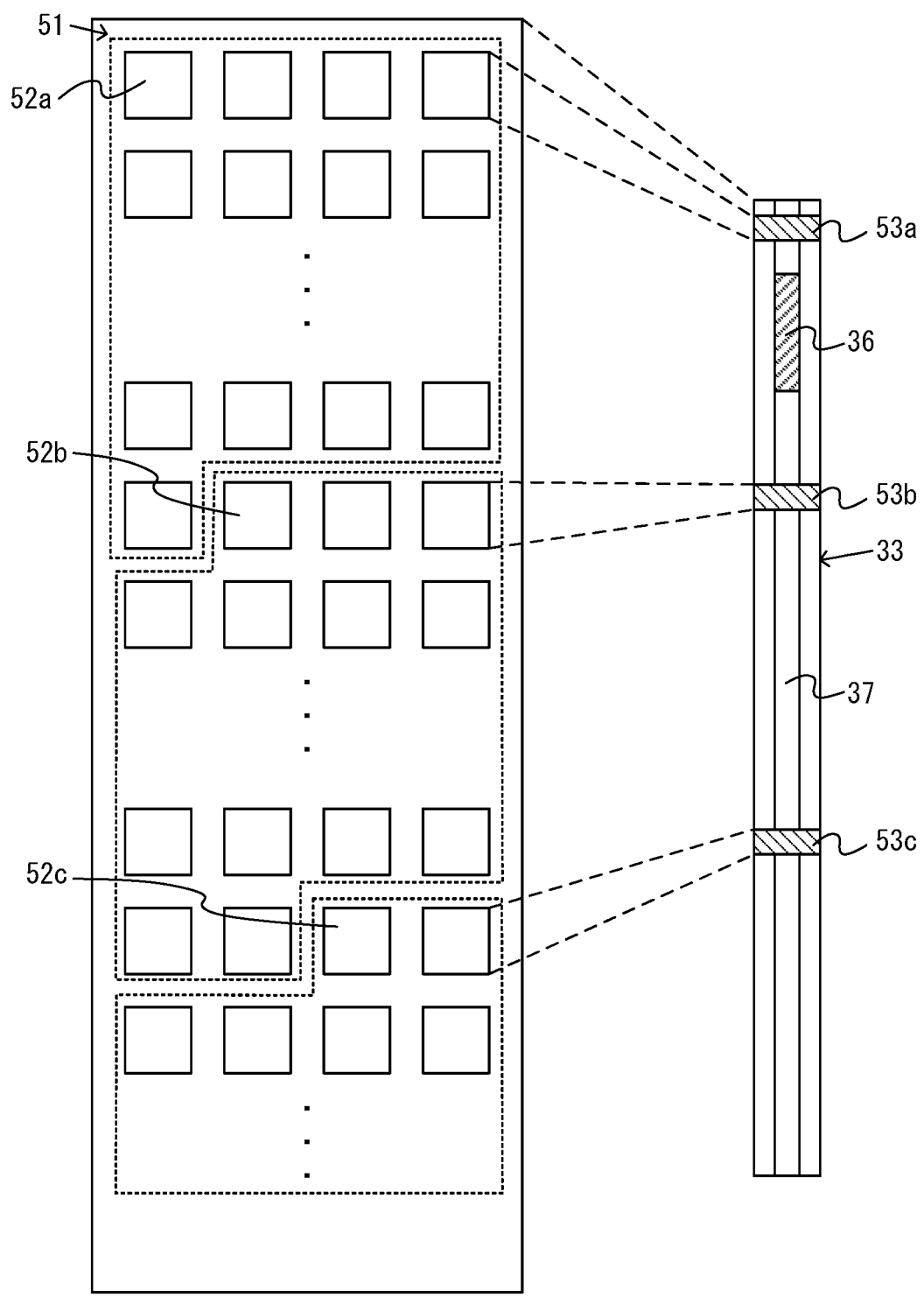
FIG. 12 shows an example of a relationship between an item group image and a scrollbar according to a modification of the embodiment.

The phrase "displaying a marker at the position indicating a category" is not limited to a mode in which the marker on the scrollbar indicates the exact position or area of the category in the item group image 32. For example, in the modification shown in FIG. 11, two markers may sometimes be displayed in contact with each other. In addition, when items are arranged side by side as shown in FIG. 12 described later, two markers may sometimes be displayed so as to overlap each other. In order to avoid such contacting or overlapping of the markers, the information processing apparatus 2 may display one of the markers so as to be shorter than the other marker. At this time, the one of the markers may not indicate the exact position or range of the corresponding category.

In the embodiment and the modification described above, the information processing apparatus 2 displays a marker at a position corresponding to the head of a category in which an item satisfying a condition is present. According to the embodiment and the modification described above, since the marker indicates the position near the head of the category, the user can perform a display change operation with the marker as a guide, whereby a part, of the item group image 32, near the head of the category can be easily displayed. At this time, the user can easily check the items in order from the head of the category.

In another embodiment, the information processing apparatus 2 may display a marker at a position corresponding to a head item, in an arrangement order in the item group image 32, among one or more items assigned to a category in which items satisfying a condition are present. In this case, as in the embodiment and the modification described above, the user can easily cause a part, of the item group image 32, near the head of each category to be displayed by performing a display change operation with the marker as a guide.

(Modification Regarding Item Group Image)

In the above embodiment, the item group image 32 has a configuration in which a plurality of items are arrayed in a line along the scroll direction. In another embodiment, a plurality of items in the item group image 32 may be arranged in any way along the scroll direction. Hereinafter, a modification of the item group image will be described with reference to FIG. 12.

FIG. 12 shows an example of a relationship between an item group image and a scrollbar according to the modification of the above embodiment. As shown in FIG. 12, in the item group image 51 according to this modification, a plurality of items are arranged in the scroll direction (i.e., up-down direction) and also in the direction (i.e., right-left direction) perpendicular to the scroll direction. Specifically, the items are arranged such that a line of items (here, four items) are arranged from the upper-left position in the rightward direction, and an item next to the rightmost item in this line is placed at the leftmost position in a line just below the line. In FIG. 12, items included in the same category are surrounded by a dotted line.

The aforementioned marker can also be applied to the case where the items are arranged in the manner as shown in FIG. 12. Specifically, as in the above embodiment, the information processing apparatus 2 places markers 53a to 53c at positions (specifically, positions on the scrollbar 33) corresponding to the positions of the heads of categories where items satisfying a condition are present (refer to FIG. 12). In this modification, images indicating the names of the categories are not included in the item group image 51, and therefore, the positions of the head items 52a to 52c in the arrangement order in the item group image 51 are the positions of the heads of the categories. Therefore, in this modification, the information processing apparatus 2 displays the markers 53a to 53c at the positions of the head items 52a to 52c in the arrangement order in the item group image 51 among one or more items assigned to the categories in which items satisfying the condition are present. In FIG. 12, it is assumed that each of the three categories includes an item satisfying the condition. In the modification shown in FIG. 12, as in the aforementioned embodiment, the user can easily cause parts, of the item group image, near the heads of the categories to be displayed, by using the markers 53a to 53c as guides.

A marker indicating an area of a category in the item group image 32 (refer to FIG. 11) may also be applied to the item group image 51 shown in FIG. 12. In the example shown in FIG. 12, a last item in a certain category and a head item in the next category may sometimes be placed at the same position with respect to the scroll direction. In this case, markers corresponding to these two categories may be placed so as to overlap each other on the scrollbar. Alternatively, the two markers may be placed so as not to overlap each other. For example, in FIG. 12, the marker 53a may be placed such that the lower end thereof comes into contact with the upper end of the marker 53b.

(Modification of Item)

In the above embodiment, the items included in the item group image indicate facilities to be placed on the game map. However, the items may indicate any game objects. For example, the items may indicate characters (e.g., player characters or units as described above) that appear in the game, or may indicate game items that appear in the game. When the items indicate characters, the characters may be classified into categories, based on the attribute, rarity, or level set on each character. When the items indicate game items, the game items may be classified into categories, based on the type or function of each game item.

The items may indicate game objects to be used in a predetermined game process (step S3) that affects a parameter (in the above embodiment, the number of jewels) used for determination of a condition for displaying a marker. For example, the items may indicate not only the facilities as described in the above embodiment but also units that appears in the game in the predetermined game process, game items to be used in the game, etc. However, the items are not limited to those indicating game objects to be used in the predetermined game process, and may be those indicating game objects to be used in another game process different from the predetermined game process.

In the above embodiment, the items are game objects (i.e., offensive facilities, defensive facilities, and traps) that give advantageous effects to the user in the game process. Examples of the game objects that give the advantageous effects to the user in the game process include: facilities to be placed on the game map as described above; items such as weapons and protective gears to be used in the game; and skills or the like that can be set on characters that appear in the game. The items may indicate game objects (e.g., decorative facilities) that do not given advantageous effects to the user in the game process.

(Other Modifications)

In the above embodiment, the mode in which the game application of the simulation game is executed in the information processing system has been described as an example. However, the genre of the game in the game application executed in the information processing system is arbitrary. The scrollbar including the marker is applicable to an item group image including a plurality of items indicating any game objects. In another embodiment, the scrollbar may be used in applications other than game applications. That is, the scrollbar is also applicable to an item group image including a plurality of items indicating any information (e.g., a web page including a plurality of thumbnail images as items).

The above embodiment can be used as, for example, a game program or a game system for the purpose of, for example, allowing the user to easily cause a desired part of a content to be displayed.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having a game program stored therein, the game program comprising instructions that cause the computer to execute:

displaying a part of an item group image on a display device in a scrollable manner, the item group image including a plurality of items arranged in an order, each of the plurality of items is assigned to one category among a plurality of categories;

displaying a scrollbar on the display device, the scrollbar including a knob corresponding to a displayed part of the item group image, and a track area in which the knob is movable, wherein the displayed part indicated by a position of the knob is displayed on the display device, wherein, in the item group image, items assigned to the same category out of the plurality of categories are collectively arranged;

displaying at least one marker in association with the scrollbar, wherein a position of the at least one marker indicates a part of the item group image, wherein each of the at least one markers is associated with at least one of the plurality of categories and displayed at a position of the corresponding at least one of the plurality of categories;

setting different display forms for each of the least one markers based on whether one or more items within the corresponding at least one of the plurality of categories satisfies a corresponding condition as to whether a process corresponding to the item can be executed;

receiving an instruction from a user to specify one of the plurality of items; and dynamically changing, after specification of the one of the plurality of items, the display form of the marker corresponding with the specified one of the plurality of items based on the one of the plurality of items no longer satisfying the corresponding condition as to whether the process corresponding to the item can be executed, wherein each of the plurality of items is associated with an item point value and satisfaction of the corresponding condition includes having the item point value for the associated item be less than or equal to a total number of points that are associated with the user.

2. The storage medium according to claim 1, wherein the computer displays the at least one marker at a position corresponding to a head of each of the plurality of categories, or a position corresponding to a head item in the order among one or more items assigned to the category.

3. The storage medium according to claim 1, wherein the computer displays the at least one marker, in association with the scrollbar, at a position according to an item that satisfies a condition regarding a parameter related to a game.

4. The storage medium according to claim 3, wherein the game program comprises further instructions that cause the computer to execute:

performing a game process based on an operation performed by a user; and changing the parameter based on a result of the game process, and the computer displays the at least one marker at a position according to an item that satisfies the condition with respect to the parameter having been changed, wherein the process corresponding to the item is the game process.

5. The storage medium according to claim 4, wherein the item indicates a game object to be used in the game process.

6. The storage medium according to claim 5, wherein the game program comprises further instructions that cause the computer to execute:

selecting any item from among the plurality of items, based on an operation performed by the user; and generating a game object indicated by the selected item, or strengthening the game object.

7. The storage medium according to claim 4, wherein the item indicates a game object that gives an advantageous effect to the user in the game process.

8. The storage medium according to claim 3, wherein the game program comprises further instructions that cause the computer to execute:

selecting any item from among the plurality of items, based on an operation performed by a user, the computer changes the parameter in accordance with the item selected from among the plurality of items, and the computer displays the at least one market at a position according to an item that satisfies the condition with respect to the parameter having been changed.

9. The storage medium according to claim 3, wherein a condition value for the parameter to satisfy the condition is set for each of the plurality of items.

10. The storage medium according to claim 1, wherein the computer displays the at least one marker and the knob so as to be distinguishable from each other even when a part of the at least one marker overlaps at least a part of the knob.

11. The non-transitory computer-readable storage medium of claim 1, wherein the one or more items are game objects that are usable part of the game program and the process corresponding to the item is a game process that uses corresponding item as part of the game program, and the wherein the game program comprises further instructions that cause the computer to execute:

select, in response to a selection instruction, one of the items that satisfies the corresponding condition; and cause, based on selection of the one or more items, the game process to be executed by using the selected one of the items as part of the game program.

12. The non-transitory computer-readable storage medium of claim 1, wherein the display form of marker(s) for the one or more items that satisfy the corresponding condition are set to a first display form and the display form of marker(s) for one or more items that do not satisfy the corresponding condition are set to a second display form, which is different from the first display form.

13. The non-transitory computer-readable storage medium of claim 12, wherein the difference in display form between the first and second display form is at least one of color, brightness, size, shape, and/or pattern.

14. An information processing apparatus comprising:
one or more processors being configured to:

display a part of an item group image on a display device in a scrollable manner, the item group image including a plurality of items arranged in an order, each of the plurality of items is assigned to one category among a plurality of categories;

display a scrollbar on the display device, the scrollbar including a knob corresponding to a displayed part of the item group image, and a track area in which the knob is movable, wherein the displayed part indicated by a position of the knob is displayed on the display device, wherein, in the item group image, items assigned to the same category out of the plurality of categories are collectively arranged;

display at least one marker in association with the scrollbar, wherein a position of the at least one marker indicates a part of the item group image, wherein each of the at least one markers is associated with at least one of the plurality of categories and displayed at a position of the corresponding at least one of the plurality of categories;

set different display forms for each of the least one markers based on whether one or more items within the corresponding at least one of the plurality of categories satisfies a corresponding condition as to whether a process corresponding to the item can be executed;

receive an instruction from a user to specify one of the plurality of items; and dynamically change, after specification of the one of the plurality of items, the display form of the marker corresponding with the specified one of the plurality of items based on the one of the plurality of items no longer satisfying the corresponding condition as to whether the process corresponding to the item can be executed, wherein each of the plurality of items is associated with an item point value and satisfaction of the corresponding condition includes having the item point value for the associated item be less than or equal to a total number of points that are associated with the user.

15. An information processing system comprising:

one or more processors being configured to:

display a part of an item group image on a display device in a scrollable manner, the item group image including a plurality of items arranged in an order, each of the plurality of items is assigned to one category among a plurality of categories;

display a scrollbar on the display device, the scrollbar including a knob corresponding to a displayed part of the item group image, and a track area in which the knob is movable, wherein the displayed part indicated by a position of the knob is displayed on the display device, wherein, in the item group image, items assigned to the same category out of the plurality of categories are collectively arranged;

display at least one marker in association with the scrollbar, wherein a position of the at least one marker indicates a part of the item group image, wherein each of the at least one markers is associated with at least one of the plurality of categories and displayed at a position of the corresponding at least one of the plurality of categories;

set different display forms for each of the least one markers based on whether one or more items within the corresponding at least one of the plurality of categories satisfies a corresponding condition as to whether a process corresponding to the item can be executed;

receive an instruction from a user to specify one of the plurality of items; and dynamically change, after specification of the one of the plurality of items, the display form of the marker corresponding with the specified one of the plurality of items based on the one of the plurality of items no longer satisfying the corresponding condition as to whether the process corresponding to the item can be executed, wherein each of the plurality of items is associated with an item point value and satisfaction of the corresponding condition includes having the item point value for the associated item be less than or equal to a total number of points that are associated with the user.

16. A game processing method executed in an information processing system, the game processing method comprising:

displaying a part of an item group image on a display device in a scrollable manner, the item group image including a plurality of items arranged in an order, each of the plurality of items is assigned to one category among a plurality of categories;

displaying at least one scrollbar on the display device, the scrollbar including a knob corresponding to a displayed part of the item group image, and a track area in which the knob is movable, wherein the displayed part indicated by a position of the knob is displayed on the display device, wherein, in the item group image, items assigned to the same category out of the plurality of categories are collectively arranged;

displaying a marker in association with the scrollbar, wherein a position of the at least one marker indicates a part of the item group image, wherein each of the at least one markers is associated with at least one of the plurality of categories and displayed at a position of the corresponding at least one of the plurality of categories;

setting different display forms for each of the least one markers based on whether one or more items within the corresponding at least one of the plurality of categories satisfies a corresponding condition as to whether a process corresponding to the item can be executed;

receiving an instruction from a user to specify one of the plurality of items; and dynamically changing, after specification of the one of the plurality of items, the display form of the marker corresponding with the specified one of the plurality of items based on the one of the plurality of items no longer satisfying the corresponding condition as to whether the process corresponding to the item can be executed, wherein each of the plurality of items is associated with an item point value and satisfaction of the corresponding condition includes having the item point value for the associated item be less than or equal to a total number of points that are associated with the user.

* * * * *